United States Patent
Seregin et al.

(10) Patent No.: US 10,097,842 B2
(45) Date of Patent: Oct. 9, 2018

(54) RESTRICTION OF ESCAPE PIXEL SIGNALED VALUES IN PALETTE MODE VIDEO CODING

(71) Applicant: QUALCOMM Incorporated, San Diego, CA (US)

(72) Inventors: Vadim Seregin, San Diego, CA (US); Rajan Laxman Joshi, San Diego, CA (US); Krishnakanth Rapaka, San Diego, CA (US); Marta Karczewicz, San Diego, CA (US); Cheng-Teh Hsieh, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 106 days.

(21) Appl. No.: 15/266,623

(22) Filed: Sep. 15, 2016

(65) Prior Publication Data
US 2017/0085891 A1   Mar. 23, 2017

Related U.S. Application Data

(60) Provisional application No. 62/220,675, filed on Sep. 18, 2015.

(51) Int. Cl.
*H04N 19/176* (2014.01)
*H04N 19/196* (2014.01)
(Continued)

(52) U.S. Cl.
CPC ......... *H04N 19/198* (2014.11); *H04N 19/124* (2014.11); *H04N 19/157* (2014.11);
(Continued)

(58) Field of Classification Search
CPC .. H04N 19/124; H04N 19/157; H04N 19/176; H04N 19/182; H04N 19/186; H04N 19/198; H04N 19/463; H04N 19/593
(Continued)

(56) References Cited

U.S. PATENT DOCUMENTS 9,596,479 B2 * 3/2017 Liu .................. H04N 19/50
9,807,402 B2 * 10/2017 Lin ................. H04N 19/186
(Continued)

FOREIGN PATENT DOCUMENTS

WO   2015139165 A1   9/2015
WO   2016055486 A1   4/2016

OTHER PUBLICATIONS

Atta et al, A layered video coding scheme with its optimum bit allocation (Year: 2003).*
(Continued)

*Primary Examiner* — Shan E Elahi
(74) *Attorney, Agent, or Firm* — Shumaker & Sieffert, P.A.

(57) ABSTRACT

An apparatus configured to decode video data that comprises a memory configured to store the video data; and one or more processors. The one or more processors are configured to: receive a bitstream that is constrained such that escape values used in a palette mode for decoding the video data are no greater than a maximum value, wherein the bitstream includes information for determining at least one escape value representing a sample in a block of the video data to be decoded; and reconstruct the sample in the block of the video data using the information for determining the at least one escape value.

86 Claims, 9 Drawing Sheets

(51) Int. Cl.
  *H04N 19/186* (2014.01)
  *H04N 19/593* (2014.01)
  *H04N 19/463* (2014.01)
  *H04N 19/124* (2014.01)
  *H04N 19/157* (2014.01)
  *H04N 19/182* (2014.01)

(52) U.S. Cl.
  CPC ......... *H04N 19/176* (2014.11); *H04N 19/182* (2014.11); *H04N 19/186* (2014.11); *H04N 19/463* (2014.11); *H04N 19/593* (2014.11)

(58) Field of Classification Search
  USPC ..................................................... 375/240.02
  See application file for complete search history.

(56) References Cited

U.S. PATENT DOCUMENTS

| | | | | |
|---|---|---|---|---|
| 2006/0227866 | A1* | 10/2006 | Winger | H04N 19/176 375/240.03 |
| 2015/0010068 | A1* | 1/2015 | Francois | H04N 19/88 375/240.08 |
| 2015/0189302 | A1* | 7/2015 | Pu | H04N 19/176 375/240.24 |
| 2015/0189319 | A1 | 7/2015 | Pu et al. | |
| 2015/0264365 | A1* | 9/2015 | Tsai | H04N 19/593 375/240.03 |
| 2015/0281703 | A1* | 10/2015 | Zou | H04N 19/80 375/240.24 |
| 2015/0341673 | A1* | 11/2015 | Joshi | H04N 19/70 375/240.12 |
| 2015/0373339 | A1* | 12/2015 | Zou | H04N 19/176 375/240.24 |
| 2015/0373340 | A1* | 12/2015 | Zou | H04N 19/176 375/240.24 |
| 2016/0007042 | A1* | 1/2016 | Pu | H05K 999/99 375/240.13 |
| 2016/0100179 | A1 | 4/2016 | He et al. | |
| 2016/0191931 | A1* | 6/2016 | Hannuksela | H04N 19/105 375/240.12 |

OTHER PUBLICATIONS

Response to Written Opinion dated Jan. 20, 2017, from International Application No. PCT/US2016/052186, filed on Jul. 13, 2017, 32 pp.
Second Written Opinion from International Application No. PCT/US2016/052186, dated Aug. 23, 2017, 9 pp.
International Preliminary Report on Patentability from International Application No. PCT/US2016/052186, dated Nov. 16, 2017, 11 pp.
International Search Report and Written Opinion of International Application No. PCT/US2016/052186, dated Jan. 20, 2017, 19 pp.
Invitation to Restrict or Pay Additional Fees from International Application No. PCT/US2016/052186, dated Nov. 18, 2016, 8 pp.

Sharman et al., "AHG18: Worst-case Escape Code Length Mitigation," JCT-VC Meeting, Mar. 27, 2014-Apr. 4, 2014; Valencia; (Joint Collaborative Team on Video Coding of ISO/IEC JTC1/SC29/WG11 and ITU-T SG.16 ); URL: http://wftp3.itu.int/av-arch/jctvc-site/,, No. JCTVC-Q0073-v2, Mar. 24, 2014, 6 pp.
Xiu X et al., "Non-CE1: On Escape Color Coding for Palette Coding Mode," JCT-VC Meeting; Feb. 10, 2015-Feb. 18, 2015; Geneva; (Joint Collaborative Team On Video Coding Of ISO/IEC JTC1/SC29/WG11 and ITU-TSG.16 ); URL: http://wftp3.itu.int/av-arch/jctvc-site/,, No. JCTVC-T0118_r1, Feb. 6, 2015 , 11 pp.
Xu et al., "Overview of the Emerging HEVC Screen Content Coding Extension", IEEE Transactions on Circuits and Systems for Video Technology, vol. 26, Issue.1, Sep. 14, 2015, pp. 50-62.
Pu et al., "AHG10: Suggested Software for Palette Coding based on RExt6.0", Joint Collaborative Team on Video Coding (JCT-VC) of ITU-T SG16 WP3 and ISO/IEC JTC1/SC29/WG11 17th Meeting: Valencia, ES Mar. 27-Apr. 4, 2014, JCTVC-Q0094, Mar. 19, 2014, 4 pp.
Li et al., "On the palette escape pixel coding", Joint Collaborative Team on Video Coding (JCT-VC) of ITU-T SG 16 WP 3 and ISO/IEC JTC 1/SC 29/WG 11 21st Meeting: Warsaw, PL, Jun. 19-26, 2015, JCTVC-U0052, Jun. 9, 2015, 9 pp.
Joshi et al., "High Efficiency Video Coding (HEVC) Screen Content Coding: Draft 4", Joint Collaborative Team on Video Coding (JCT-VC) of ITU-T SG 16 WP 3 and ISO/IEC JTC 1/SC 29/WG 11 21st Meeting: Warsaw, PL, Jun. 19-26, 2015, JCTVC-U1005, Sep. 5, 2015, 675 pp.
Seregin et al., "Restriction on signalling for palette escape samples", Joint Collaborative Team on Video Coding (JCT-VC) of ITU-T SG 16 WP 3 and ISO/IEC JTC 1/SC 29/WG 11 22nd Meeting: Geneva, CH, Oct. 15-21, 2015, JCTVC-V0041, Oct. 6, 2015, 5 pp.
Joshi et al., "High Efficiency Video Coding (HEVC) Screen Content Coding: Draft 6", Joint Collaborative Team on Video Coding (JCT-VC) of ITU-T SG 16 WP 3 and ISO/IEC JTC 1/SC 29/WG 11 23rd Meeting: San Diego, USA, Feb. 19-26, 2016, JCTVC-W1005_v3, May 29, 2016, 708 pp.
Bross et al., "High efficiency video coding (HEVC) text specification draft 10 (For FDIS & Consent)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v13, Jan. 30, 2013, 331 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
ITU-T H.263, Series H: Audiovisual and Multimedia Systems, Infrastructure of audiovisual services—Coding of moving video, Video coding for low bit rate communication, The International Telecommunication Union. Jan. 2015, 226 pp.

* cited by examiner

RESTRICTION OF ESCAPE PIXEL SIGNALED VALUES IN PALETTE MODE VIDEO CODING

This application claims the benefit of U.S. Provisional Patent Application No. 62/220,675 filed on Sep. 18, 2015, which is hereby incorporated by reference herein in its entirety.

TECHNICAL FIELD

This disclosure relates to encoding and decoding content, and more specifically, encoding and decoding content according to a palette-based coding mode.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), ITU-T H.265, High Efficiency Video Coding (HEVC), and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized.

Content, such as an image or video, may be encoded and decoded using a palette mode. Generally, palette mode is another technique for coding pixels in a picture. Palette mode involves use of a palette of color values to represent content of pixels. Content may be encoded such that the content pixels are represented values corresponding to color values in the palette. An index map may be decoded to map pixels to color values in the palette, and thereby obtain color values to reconstruct the content.

SUMMARY

Techniques of this disclosure relate to palette-based video coding. For example, in palette-based coding, a video coder (a video encoder or video decoder) may form a "palette" as a table of colors for representing the video data of a particular area (e.g., a given block). Palette-based coding may be especially useful for coding areas of video data having a relatively small number of colors. Rather than coding actual pixel values (or their residuals), the video coder may code palette indices for one or more of the pixels that relate the pixels with entries in the palette representing the colors of the pixels. The techniques described in this disclosure may include techniques for various combinations of one or more of signaling palette-based coding modes, transmitting palettes, deriving palettes, and transmitting palette-based coding maps and other syntax elements.

In one example, a method of decoding video data comprises: receiving a bitstream that is constrained such that escape values used in a palette mode for decoding the video data are no greater than a maximum value, wherein the bitstream includes information for determining at least one escape value representing a sample in a block of the video data to be decoded; and reconstructing the sample in the block of the video data using the information for determining the at least one escape value.

In another example, a method of encoding video data comprises: determining a maximum value for escape values used in a palette mode for encoding the video data, wherein the escape values represent samples in a block of the video data to be encoded; restricting one or more escape values to be no greater than the maximum value; and encoding the one or more escape values in an encoded video data bitstream.

In another example, a method of decoding video data comprises: receiving a bitstream that includes information for determining at least one escape value used in a palette mode for decoding the video data, wherein the bitstream is constrained such that it is compliant with a restriction ensuring that the at least one escape value is quantized according to a quantization parameter that is not less than a quantization parameter lower bound; determining the at least one escape value from the bitstream based on the restriction; and reconstructing a sample of the video data using the at least one escape value.

In another example, a method of encoding video data comprises: determining a quantization parameter value for the video data; determining a quantization parameter lower bound; quantizing escape values used in a palette mode for encoding the video data according to the quantization parameter lower bound if the quantization parameter value is less than the quantization parameter lower bound, wherein the escape values represent samples in a block of the video data to be encoded; and encoding the escape values in an encoded video data bitstream.

In another example, an apparatus configured to decode video data, the apparatus comprises: a memory configured to store the video data; and one or more processors configured to: receive a bitstream that is constrained such that escape values used in a palette mode for decoding the video data are no greater than a maximum value, wherein the bitstream includes information for determining at least one escape value representing a sample in a block of the video data to be decoded; and reconstruct the sample in the block of the video data using the information for determining the at least one escape value.

In another example, an apparatus configured to encode video data, the apparatus comprises: a memory configured to store the video data; and one or more processors configured to: determine a maximum value for escape values used in a palette mode for encoding the video data, wherein the escape values represent samples in a block of the video data to be encoded; restrict one or more escape values to be no greater than the maximum value; and encode the one or more escape values in an encoded video data bitstream.

In another example, an apparatus configured to decode video data, the apparatus comprises: a memory configured to store the video data; and one or more processors configured to: receive a bitstream that includes information for determining at least one escape value used in a palette mode for decoding the video data, wherein the bitstream is constrained such that it is compliant with a restriction ensuring that the at least one escape value is quantized according to a quantization parameter that is not less than a quantization parameter lower bound; determine the at least one escape value from the bitstream based on the restriction; and reconstruct a sample of the video data using the at least one escape value.

In another example, an apparatus configured to encode video data, the apparatus comprises: a memory configured to store the video data; and one or more processors configured to: determine a quantization parameter value for the video data; determine a quantization parameter lower bound; quantize escape values used in a palette mode for encoding the video data according to the quantization parameter lower bound if the quantization parameter value is less than the quantization parameter lower bound, wherein the escape values represent samples in a block of the video data to be encoded; and encode the escape values in an encoded video data bitstream.

In another example, an apparatus configured to decode video data, the apparatus comprises: means for receiving a bitstream that is constrained such that escape values used in a palette mode for decoding the video data are no greater than a maximum value, wherein the bitstream includes information for determining at least one escape value representing a sample in a block of the video data to be decoded; and means for reconstructing the sample in the block of the video data using the information for determining the at least one escape value.

In another example, an apparatus configured to decode video data, the apparatus comprises: means for receiving a bitstream that includes information for determining at least one escape value used in a palette mode for decoding the video data, wherein the bitstream is constrained such that it is compliant with a restriction ensuring that the at least one escape value is quantized according to a quantization parameter that is not less than a quantization parameter lower bound; means for determining the at least one escape value from the bitstream based on the restriction; and means for reconstructing a sample of the video data using the at least one escape value.

In another example, a non-transitory computer-readable medium having stored thereon instructions that, when executed, cause one or more processors to: receive a bitstream that is constrained such that escape values used in a palette mode for decoding the video data are no greater than a maximum value, wherein the bitstream includes information for determining at least one escape value representing a sample in a block of the video data to be decoded; and reconstruct the sample in the block of the video data using the information for determining the at least one escape value.

In another example, a non-transitory computer-readable medium having stored thereon instructions that, when executed, cause one or more processors to: receive a bitstream that includes information for determining at least one escape value used in a palette mode for decoding the video data, wherein the bitstream is constrained such that it is compliant with a restriction ensuring that the at least one escape value is quantized according to a quantization parameter that is not less than a quantization parameter lower bound; determine the at least one escape value from the bitstream based on the restriction; and reconstruct a sample of the video data using the at least one escape value.

The details of one or more examples of the disclosure are set forth in the accompanying drawings and the description below. Other features, objects, and advantages will be apparent from the description, drawings, and claims.

DETAILED DESCRIPTION

Figure 1:
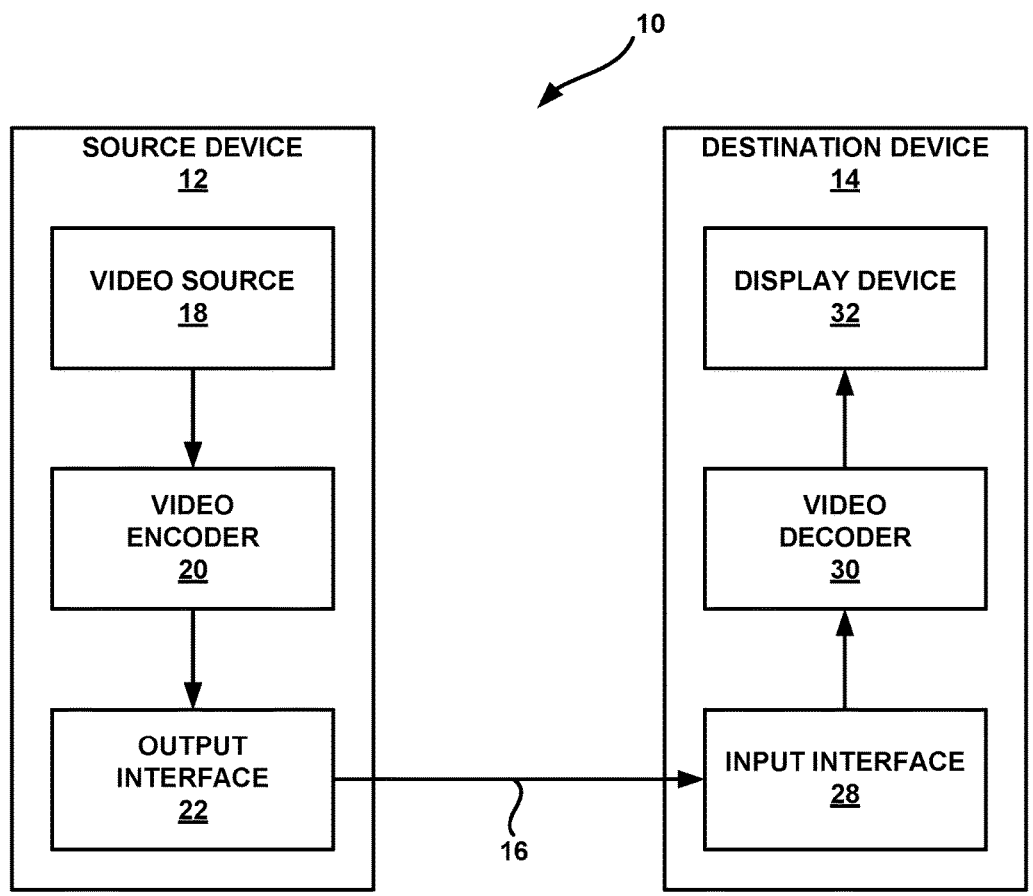
FIG. 1 is a block diagram illustrating an example video coding system that may utilize the techniques described in this disclosure.

This disclosure describes techniques for video coding and compression. In particular, this disclosure describes techniques for palette-based coding of video data. In some examples, aspects of the techniques also may be used for coding of other content such as individual pictures. In traditional video coding, images are assumed to natural images that are continuous-tone and spatially smooth. Based on these assumptions, various tools have been developed such as block-based transform, filtering, etc., and such tools have shown good performance for natural content videos.

However, in applications like remote desktop, collaborative work and wireless display, computer generated screen content may be the dominant content to be compressed. This type of content tends to have discrete-tone and feature sharp lines and high contrast object boundaries. The assumption of continuous-tone and smoothness may no longer apply, and thus, traditional video coding techniques may be inefficient ways to compress the content.

In some examples, the palette-based coding techniques may be configured for use with one or more video coding standards. For example, ITU-T H.265, High Efficiency Video Coding (HEVC), is a new video coding standard developed by the Joint Collaboration Team on Video Coding (JCT-VC) of ITU-T Video Coding Experts Group (VCEG) and ISO/IEC Motion Picture Experts Group (MPEG). The HEVC standard is published as ITU-T H.265, Series H: Audiovisual and Multimedia Systems, Infrastructure of audiovisual services—Coding of moving video, High Efficiency Video Coding, The International Telecommunication Union. April 2015 (hereinafter "HEVC").

With respect to the HEVC framework, as an example, the palette-based coding techniques may be configured to be used as a coding unit (CU) mode. In other examples, the palette-based coding techniques may be configured to be used as a PU mode in the framework of HEVC. Accordingly, all of the following disclosed processes described in the context of CU coding may, additionally or alternatively, apply to PU coding. However, these HEVC-based examples should not be considered a restriction or limitation of the palette-based coding techniques described herein, as such techniques may be applied to work independently or as part of other existing or yet to be developed systems/standards. In these cases, the unit for palette coding can be square blocks, rectangular blocks or even regions of non-rectangular shape.

In palette-based coding, a particular area of video data may be assumed to have a relatively small number of colors. A video coder (a video encoder or video decoder) may code a so-called "palette" as a table of colors for representing the video data of the particular area (e.g., a given block). Each pixel in a block may be associated with an entry in the palette that represents the color value of the pixel. For example, the video coder may code an index for a pixel that relates the color value of the pixel in the block to the appropriate color value in the palette.

In the example above, a video encoder may encode a block of video data by determining a palette for the block, locating an entry in the palette to represent the value of each pixel, and encoding the palette with palette indices (also referred to as palette index values) for the pixels relating the pixel value to the palette. A video decoder may obtain, from an encoded bitstream, a palette for a block, as well as palette indices for the pixels of the block. The video decoder may relate the palette indices of the pixels to entries of the palette to reconstruct the pixel values of the block. Pixels (and/or related palette indices that indicate a pixel value) may generally be referred to as samples.

It is assumed that samples in the block are processed (e.g., scanned) using a certain scanning order. For example, the video encoder may convert a two-dimensional block of palette indices into a one-dimensional array by scanning the palette indices using the scanning order. Likewise, the video decoder may reconstruct a block of palette indices using the scanning order. Accordingly, this disclosure may refer to a previous sample as a sample that precedes the sample currently being coded in the block in the scanning order. For example, the scanning order can be a horizontal scan order, vertical scanning order, traverse/transverse (snake like) scanning order, forward or backward scanning order and etc. It should be appreciated that scans other than those mentioned may also be applicable. The example above is intended provide a general description of palette-based coding.

A palette typically includes entries numbered by an index and representing color component (for example, RGB, YUV, or the like) values or intensities. Both a video encoder and a video decoder determine the number of palette entries, color component values for each palette entry and the exact ordering of the palette entries for the current block. In this disclosure, it is assumed that each palette entry specifies the values for all color components of a sample. However, the concepts of this disclosure are applicable to using a separate palette for each color component.

In some examples, a palette may be composed using information from previously coded blocks. That is, a palette may contain predicted palette entries predicted from the palette(s) used to code the previous block(s). For example, as described in standard submission document Wei Pu et al., "AHG10: Suggested Software for Palette Coding based on RExt6.0," JCTVC-Q0094, Valencia, ES, 27 Mar.-4 Apr. 2014 (hereinafter JCTVC-Q0094), a palette may include entries that are copied from a predictor palette. A predictor palette may include palette entries from blocks previously coded using palette mode or other reconstructed samples. For each entry in the predictor palette, a binary flag may be coded to indicate whether the entry associated with the flag is copied to the current palette (e.g., indicated by flag=1). The string of binary flags may be referred to as the binary palette prediction vector. The palette for coding a current block may also include a number of new palette entries, which may be explicitly coded (e.g., separately from the palette prediction vector). An indication of the number of new entries may also be coded. A sum of the predicted entries and new entries may indicate the total palette size for block.

In some examples, each sample in a block coded with a palette-based coding mode may be coded using one of the three palette modes, as set forth below:

Escape mode: in this mode, the sample value, might not be included into a palette as a palette entry, and the quantized sample value is signaled in the bitstream by the encoder explicitly for all color components. Escape mode is similar to the signaling of the new palette entries, although for new palette entries, the color component values are not quantized.

Copy Top mode (also referred to as Copy Above mode): in this mode, the palette entry index for the current sample is copied from the sample located directly above in a block. Only a syntax element specifying the length of the copy (run length) is signaled in the bitstream by the encoder for Copy Top mode.

Index mode (also referred to as Value mode or Left mode): In this mode, the value of the palette entry index is explicitly signaled in the bitstream by the encoder using, for example, a truncated binary code followed by another syntax element specifying how many following pixels in scanning order share the same index as the signaled one (run length).

As described herein, a palette entry index may be referred as a palette index or simply an index. These terms can be used interchangeably to describe techniques of this disclosure. In addition, as described in greater detail below, a palette index may have one or more associated color or intensity values. For example, a palette index may have a single associated color or intensity value associated with a single color or intensity component of a pixel (e.g., a Red component of RGB data, a Y component of YUV data, or the like). In another example, a palette index may have multiple associated color or intensity values. In some instances, palette-based coding may be applied to code monochrome video. Accordingly, "color value" may generally refer to any color or non-color component (in the case of monochrome) used to generate a pixel value.

For Copy Top and Index modes, a run value (which may also be referred to simply as run) may also be signaled. A run value may indicate a number of consecutive samples (e.g., a run of samples) in a particular scan order in a palette-coded block that are coded together. In some instances, the run of samples may also be referred to as a run of palette indices, because each sample of the run has an associated index to a palette.

A run value may indicate a run of palette indices that are coded using the same palette-coding mode. For example, with respect to Index mode, a video coder (a video encoder or video decoder) may code a palette index (also referred to as a palette index value or simply index value) and a run value that indicates a number of consecutive samples in a scan order that have the same palette index and that are being coded with the palette index. With respect to Copy Top mode, the video coder may code an indication that an index for the current sample value is copied based on an index of an above-neighboring sample (e.g., a sample that is positioned above the sample currently being coded in a block) and a run value that indicates a number of consecutive samples in a scan order that also copy a palette index from above-neighboring samples. Accordingly, in the examples above, a run of palette indices refers to a run of palette indices having the same value or a run of palette indices that are copied from above-neighboring palette indices.

Hence, the run may specify, for a given mode, the number of subsequent samples that belong to the same mode. In some instances, signaling an index and a run value may be similar to run length coding. In an example for purposes of illustration, a string of consecutive palette indices of a block may be 0, 2, 2, 2, 2, 5 (e.g., where each index corresponds to a sample in the block). In this example, a video coder may code the second sample (e.g., the first palette index of two) using Index mode. After coding an index that is equal to 2, the video coder may code a run of three, which indicates that the three subsequent samples also have the same palette index of two. In a similar manner, coding a run of four palette indices after coding an index using Copy Top mode may indicate that a total of five palette indices are copied from the corresponding palette indices in the row above the sample position currently being coded.

Escape samples (also referred to as escape pixels) may be samples (or pixels) of a block that do not have a corresponding color represented in a palette for coding the block. Accordingly, escape samples may not be reconstructed using a color entry (or pixel value) from a palette. Instead, the color values for escape samples are signaled in a bitstream separately from the color values of the palette.

A video coder (e.g., a video encoder and a video decoder) may code per-sample data that indicates whether a sample of a palette-coded block is coded based on a color of the sample not being included in a palette for the block, e.g., using the process referred to as "Escape mode" above. In some examples, the video coder may be configured to increase the number of palette entries of a palette by one to accommodate a special index to the palette that does not correspond to any palette entry. The video coder may include the additional index as the last palette index in the increased palette for a given block. The additional index may be used as an indication of Escape mode.

In the example described above, the video coder may code, for a particular sample value of a block, data that represents the additional index to indicate that the additional sample is coded as an escape sample (e.g., a sample that does not have a color value represented in a palette for coding the block). The video coder may also code the color value(s) of the escape sample. In this example, there are only two possible modes (e.g., Copy Top mode or Index mode (also referred to as Index mode or Value mode)) to be signaled using explicit syntax. For example, if a sample is coded in Index mode and the index for Index mode is equal to the escape index (e.g., the above-noted additional index to the palette), the video coder may infer the sample to be coded as an escape sample. In some instances, no run is signaled with escape samples.

For a palette-coded block, one or more syntax elements may indicate, at block-level (e.g., a CU level or LCU level), whether any sample of the block is coded based on a color value of the sample not being included in the palette, e.g., coded as an escape sample. The one or more syntax elements may be referred to as block-level escape syntax. For example, block-level syntax may refer to syntax that is coded or determined while coding a block of video data, such as a CU or LCU. Block-level syntax may be included in a header or with other data that is associated with the block (e.g., data that is coded prior to or subsequent to a block that describes a characteristic of the block). In contrast, other syntax that is not block-level syntax may be included in a slice header or with individual pixels of video data.

In one example, a video coder may be configured to code and/or determine a flag (which may be referred to as a block-level escape flag) that indicates whether any sample of the block is coded in escape mode. For example, a flag value of zero may indicate that none of the samples of the block are coded using Escape mode. That is, the value of all samples of a block may be determined based on a color value that is included in a palette for coding the block. A flag value of one may indicate that at least one sample of the block is coded using Escape mode. That is, the value of at least one sample is coded as escape sample. Hence, the flag may indicate, for all samples of a block of video data, whether at least one sample of the block has a color value that is not included in a palette for coding the block.

Hence, in some examples, a CU level escape flag may be signaled in the bitstream that specifies whether the current CU may have an escape pixel or not. For example, the CU level escape flag may indicate whether escape values are enabled for a particular CU. As noted above, the presence of an escape sample in a CU may impact the number of palette indices for the CU. For example, a palette for a CU may have a number of indices with a largest index N, e.g., such that the index may be chosen from {0, 1, . . . , N}, inclusively.

In some instances, however, if the CU level escape flag indicates that there may be an escape pixel in the current block, the possible index values in the current block may be {0, 1, . . . , N, N+1}, where an index equal to N+1 indicates that the current pixel is an escape pixel. In such instances, for a particular sample being coded, the syntax elements having index N+1 may be the quantized pixel values. As noted above, an index less than N+1 may indicate that the current pixel is represented by a color from the palette associated with that index.

The techniques of this disclosure relate generally to escape pixel coding. An escape pixel may comprise a luma sample, or combination of a luma sample and two chroma samples depending on the escape pixel position in the block and chroma format, such as 4:4:4, 4:2:2, 4:2:0, and/or monochrome. Color component samples represent the original pixel to be coded as part of the palette mode and the signaled value can be quantized. Luma and chroma samples may have different bit depths representing the maximum possible value the original pixel may have. The palette escape value may be represented by palette_escape_val which represents the signaled values per color component of the escape coded pixel value, this value can be inverse quantized to reconstruct the escape pixel.

In some examples, an Exponential Golomb Code of order 3 for lossy coded (when cu_transquant_bypass_flag is false) coding units (CU) may be used for palette_escape_val binarization and may contain no upper bound. For example, the standard submission document Bin Li et al., "On the Palette Escape Pixel Coding," JCTVC-U0052, Warsaw, PL, 19-26 Jun. 2015 (hereinafter JCTVC-U0052), describes such a code that does not contain an upper bound.

In such instances, palette_escape_val may take any large value that the decoder is required to decode. Also, it may be a problem for a Context-Adaptive Binary Arithmetic Coding (CABAC) engine, as described in greater detail below with respect to FIGS. 2 and 3, to parse indefinitely large syntax elements. For example, unrestricted large values may cause overflow during escape reconstruction process. Techniques of this disclosure may be used to normatively restrict the value of the palette_escape_val, which can be signaled in a bitstream. This can be defined, for example, by a bitstream constraint that a conformant bitstream shall not contain palette_escape_val greater than certain value or be represented by more than certain number of bins after the binarization. In other examples, such a constraint may also apply to quantized signal escape values, reconstructed escape values, unquantized escape values, and/or escape values, and/or escape values in any other form.

Other aspects of this disclosure relate to quantization parameters (QPs). For example, the use of a QP smaller than a certain value, for example 4, may result in an input value being expanded rather than reduced. When QP is equal to that certain value (4 in the above example), nominally the corresponding quantizer step-size (qStep) may be equal to 1, meaning that quantization process outputs the same unmodified value as its input value. When QP is less than a certain value, for example 4, instead of quantizing the input value, the quantization process may expand the input value, i.e., dividing it by qStep<1. This may be used to increase the accuracy of the input value (e.g., when the input value(s) are transform coefficients). However, an escape coded pixel with qStep equal to 1 may already represent the full precision of the input value without any distortion or error. In these instances, further increasing the precision may not bring any improvement in terms of increased accuracy. This may happen not only for the escape coded pixels, but also when transform skip is used, for QPs less than a certain value, for example 4.

Examples of the present disclosure comprise a restriction on the range of the QP. For example, lower QP values may be clipped to a QP value that nominally corresponds to a qStep of 1. In another example, lower QP values may be restricted from being used in such scenario.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding. Video encoder 20 and video decoder 30 of video coding system 10 represent examples of devices that may be configured to perform techniques for palette-based video coding in accordance with various examples described in this disclosure. For example, video encoder 20 and video decoder 30 may be configured to selectively code various blocks of video data, such as CUs or PUs in HEVC coding, using either palette-based coding or non-palette based coding. Non-palette based coding modes may refer to various inter-predictive temporal coding modes or intra-predictive spatial coding modes, such as the various coding modes specified by HEVC.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

Video coding system 10 illustrated in FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" or "transmitting" certain information to another device, such as video decoder 30. The term "signaling" or "transmitting" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

In some examples, video encoder 20 and video decoder 30 operate according to a video compression standard, such as the HEVC standard mentioned above, and described in HEVC. In addition to the base HEVC standard, there are scalable video coding, multiview video coding, and 3D coding extensions for HEVC, as well as so-called Range Extensions (RExt) and Screen Content Coding (SCC). In addition, palette-based coding modes, e.g., as described in this disclosure, may be provided for extension of the HEVC standard. In some examples, the techniques described in this disclosure for palette-based coding may be applied to encoders and decoders configured to operation according to other video coding standards, such as the ITU-T-H.264/AVC standard or future standards. Accordingly, application of a palette-based coding mode for coding of coding units (CUs) or prediction units (PUs) in an HEVC codec is described for purposes of example.

In HEVC and other video coding standards, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may be a coding tree block of luma samples, two corresponding coding tree blocks of chroma samples, and syntax structures used to code the samples of the coding tree blocks. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in the raster scan.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may be a coding block of luma samples and two corresponding coding blocks of chroma samples of a picture that has a luma sample array, a Cb sample array and a Cr sample array, and syntax structures used to code the samples of the coding blocks. Video encoder 20 may partition a coding block of a CU into one or more prediction blocks. A prediction block may be a rectangular (i.e., square or non-square) block of samples on which the same prediction is applied. A prediction unit (PU) of a CU may be a prediction block of luma samples, two corresponding prediction blocks of chroma samples of a picture, and syntax structures used to predict the prediction block samples. Video encoder 20 may generate predictive luma, Cb and Cr blocks for luma, Cb and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Video encoder 20 may use uni-prediction or bi-prediction to generate the predictive blocks of a PU. When video encoder 20 uses uni-prediction to generate the predictive blocks for a PU, the PU may have a single motion vector (MV). When video encoder 20 uses bi-prediction to generate the predictive blocks for a PU, the PU may have two MVs.

After video encoder 20 generates predictive luma, Cb and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb and Cr residual blocks of a CU into one or more luma, Cb and Cr transform blocks. A transform block may be a rectangular block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encoding syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a bitstream that includes the entropy-encoded syntax elements. The bitstream may include a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for SEI, and so on. NAL units that encapsulate RBSPs for video coding data (as opposed to RBSPs for parameter sets and SEI messages) may be referred to as video coding layer (VCL) NAL units.

Video decoder 30 may receive a bitstream generated by video encoder 20. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20. For instance, video decoder 30 may use MVs of PUs to determine predictive blocks for the PUs of a current CU. In addition, video decoder 30 may inverse quantize transform coefficient blocks associated with TUs of the current CU. Video decoder 30 may perform inverse transforms on the transform coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In some examples, video encoder 20 and video decoder 30 may be configured to perform palette-based coding. For example, in palette-based coding, rather than performing the intra-predictive or inter-predictive coding techniques described above, video encoder 20 and video decoder 30 may code a so-called palette as a table of colors for representing the video data of the particular area (e.g., a given block). Each pixel in a block may be associated with an entry in the palette that represents the color of the pixel. For example, video encoder 20 and video decoder 30 may code an index that relates the pixel value to the appropriate value in the palette.

In the example above, video encoder 20 may encode a block of video data by determining a palette for the block, locating an entry in the palette to represent the value of each pixel, and encoding the palette with palette indices for the pixels relating the pixel value to the palette. Video decoder 30 may obtain, from an encoded bitstream, a palette for a block, as well as palette indices for the pixels of the block. Video decoder 30 may relate the palette indices of the pixels to entries of the palette to reconstruct the pixel values of the block.

As noted above, video encoder 20 and video decoder 30 may use a number of different palette coding modes to code palette indices of a palette. For example, video encoder 20 and video decoder 30 may use an Escape mode, a Copy Top mode (also referred to as Copy Above mode), or an Index mode (also referred to as Value mode or Left mode) to code palette indices of a block. In general, coding a sample using "Escape mode" may generally refer to coding a sample of a block that may not have a corresponding color represented in a palette for coding the block. As noted above, such samples may be referred to as escape samples or escape pixels.

With respect to escape signaling, video encoder 20 may encode, for a particular sample value of a block, data that represents an additional palette index to indicate that the additional sample is coded as an escape sample (e.g., a sample that does not have a color value represented in a palette for coding the block). Video encoder 20 may also encode the color value(s) of the escape sample. Accordingly, in this example, video encoder 20 and video decoder 30 may code syntax to distinguish between Copy Top mode and Index mode. In addition, video encoder 20 and video decoder 30 may then distinguish between an escape coded pixel and Index mode (or Copy Top mode) based on the index value of the pixel being coded (e.g., based on whether the index value is included in an N number of entries in the palette or whether the index value is the additional index N+1).

For escape mode, video encoder 20 signals in the bitstream, and video decoder 30 receives in the bitstream, an explicitly signaled pixel value. In some examples, according to aspects of this disclosure, video encoder 20 and video decoder 30 may be configured to perform any combination of techniques described herein for escape pixel coding, such as the techniques described below with respect to FIG. 5. In some examples, video encoder 20 and video decoder 30 may introduce a normative restriction for signaled bitstream escape pixel values which may create a parsing problem otherwise when unrestricted. For example, video encoder 20 may encode escape pixel values based on a maximum bit depth, such as 16, 32, or another number of bins. Likewise, video decoder 30 may parse an escape value from a bitstream and decode the escape value based on the maximum bit depth. In other examples, video encoder 20 and video decoder 30 may introduce a normative restriction for quantized signal escape values, reconstructed escape values, unquantized escape values, and/or escape values in any other form.

Furthermore, video encoder 20 and video decoder 30 may be configured to restrict a quantization parameter. That is, as described in greater detail below, video encoder 20 and video decoder 30 may implement the techniques of this disclosure when determining a QP for coding escape pixels.

Figure 2:
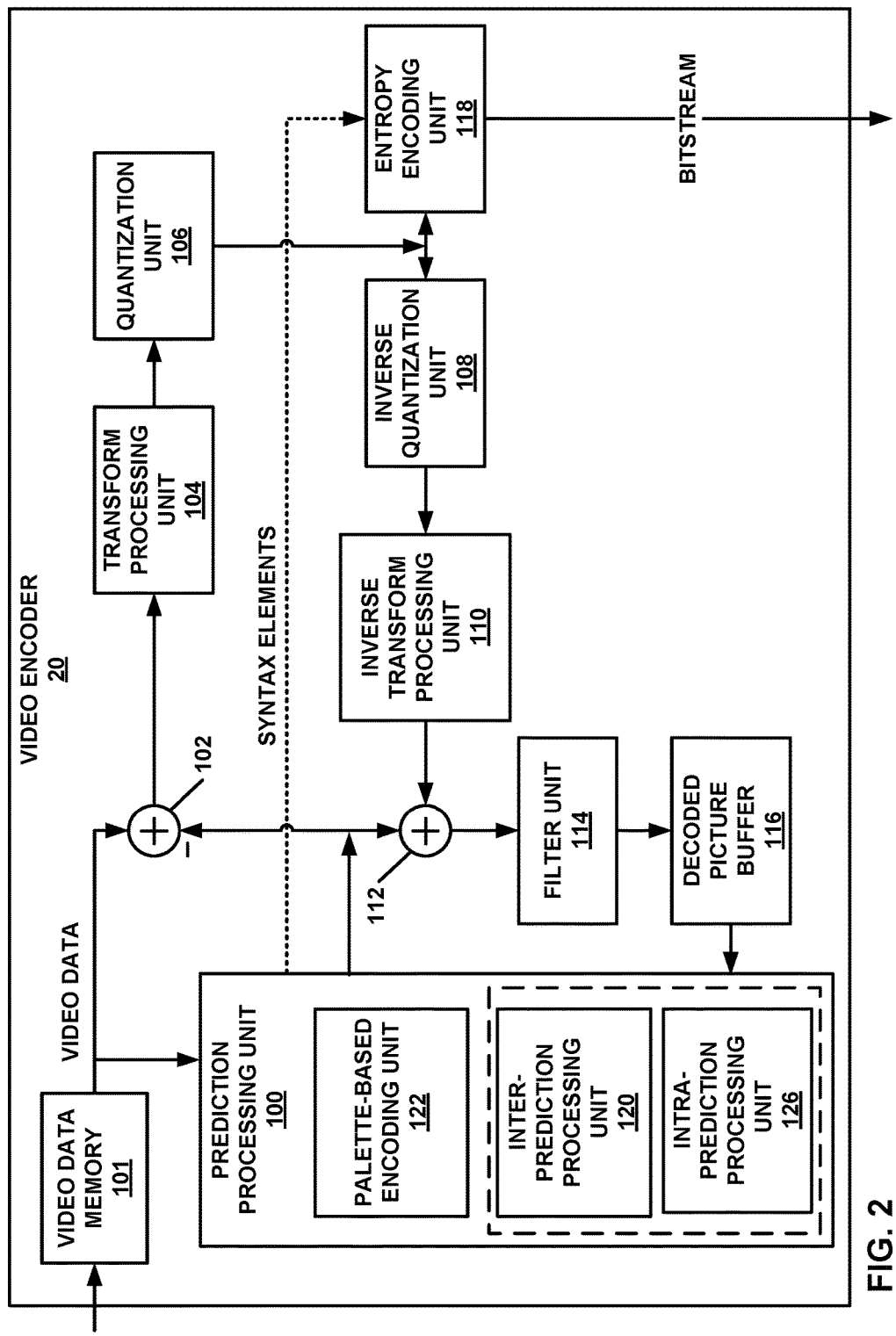
FIG. 2 is a block diagram illustrating an example video encoder that may implement the techniques described in this disclosure.

FIG. 2 is a block diagram illustrating an example video encoder 20 that may implement the techniques of this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

Video encoder 20 represents an example of a device that may be configured to perform techniques for palette-based video coding in accordance with various examples described in this disclosure. For example, video encoder 20 may be configured to selectively code various blocks of video data, such as CUs or PUs in HEVC coding, using either palette-based coding or non-palette based coding. Non-palette based coding modes may refer to various inter-predictive temporal coding modes or intra-predictive spatial coding modes, such as the various coding modes specified by HEVC. Video encoder 20, in one example, may be configured to generate a palette having entries indicating pixel values, select pixel values in a palette to represent pixel values of at least some pixel locations in a block of video data, and signal information associating at least some of the pixel locations in the block of video data with entries in the palette corresponding, respectively, to the selected pixel values in the palette. The signaled information may be used by video decoder 30 to decode video data.

In the example of FIG. 2, video encoder 20 includes a prediction processing unit 100, video data memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit and a motion compensation unit (not shown). Video encoder 20 also includes a palette-based encoding unit 122 configured to perform various aspects of the palette-based coding techniques described in this disclosure. In other examples, video encoder 20 may include more, fewer, or different functional components.

Video data memory 101 may store video data to be encoded by the components of video encoder 20. The video data stored in video data memory 101 may be obtained, for example, from video source 18. Decoded picture buffer 116 may be a reference picture memory that stores reference video data for use in encoding video data by video encoder 20, e.g., in intra- or inter-coding modes. Video data memory 101 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices. In various examples, video data memory 101 may be on-chip with other components of video encoder 20, or off-chip relative to those components.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller block may be coding blocks of CUs. For example, prediction processing unit 100 may partition a CTB associated with a CTU into four equally-sized sub-blocks, partition one or more of the sub-blocks into four equally-sized sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction unit 121 may perform different operations for a PU of a CU depending on whether the PU is in an I slice, a P slice, or a B slice. In an I slice, all PUs are intra predicted. Hence, if the PU is in an I slice, inter-prediction unit 121 does not perform inter prediction on the PU. Thus, for blocks encoded in I-mode, the predicted block is formed using spatial prediction from previously-encoded neighboring blocks within the same frame.

If a PU is in a P slice, the motion estimation unit of inter-prediction processing unit 120 may search the reference pictures in a list of reference pictures (e.g., "RefPicList0") for a reference region for the PU. The reference region for the PU may be a region, within a reference picture, that contains sample blocks that most closely corresponds to the sample blocks of the PU. The motion estimation unit may generate a reference index that indicates a position in RefPicList0 of the reference picture containing the reference region for the PU. In addition, the motion estimation unit may generate an MV that indicates a spatial displacement between a coding block of the PU and a reference location associated with the reference region. For instance, the MV may be a two-dimensional vector that provides an offset from the coordinates in the current decoded picture to coordinates in a reference picture. The motion estimation unit may output the reference index and the MV as the motion information of the PU. The motion compensation unit of inter-prediction processing unit 120 may generate the predictive blocks of the PU based on actual or interpolated samples at the reference location indicated by the motion vector of the PU.

If a PU is in a B slice, the motion estimation unit of inter-prediction processing unit 120 may perform uni-prediction or bi-prediction for the PU. To perform uni-prediction for the PU, the motion estimation unit may search the reference pictures of RefPicList0 or a second reference picture list ("RefPicList1") for a reference region for the PU. The motion estimation unit may output, as the motion information of the PU, a reference index that indicates a position in RefPicList0 or RefPicList1 of the reference picture that contains the reference region, an MV that indicates a spatial displacement between a prediction block of the PU and a reference location associated with the reference region, and one or more prediction direction indicators that indicate whether the reference picture is in RefPicList0 or RefPicList1. The motion compensation unit of inter-prediction processing unit 120 may generate the predictive blocks of the PU based at least in part on actual or interpolated samples at the reference region indicated by the motion vector of the PU.

To perform bi-directional inter prediction for a PU, the motion estimation unit may search the reference pictures in RefPicList0 for a reference region for the PU and may also search the reference pictures in RefPicList1 for another reference region for the PU. The motion estimation unit may generate reference picture indexes that indicate positions in RefPicList0 and RefPicList1 of the reference pictures that contain the reference regions. In addition, the motion estimation unit may generate MVs that indicate spatial displacements between the reference location associated with the reference regions and a sample block of the PU. The motion information of the PU may include the reference indexes and the MVs of the PU. The motion compensation unit of inter-prediction processing unit 120 may generate the predictive blocks of the PU based at least in part on actual or interpolated samples at the reference regions indicated by the motion vectors of the PU.

Video encoder 20 may be configured to perform palette-based coding. With respect to the HEVC framework, as an example, the palette-based coding techniques may be configured to be used as a coding unit (CU) mode. In other examples, the palette-based coding techniques may be configured to be used as a PU mode in the framework of HEVC. Accordingly, all of the disclosed processes described herein (throughout this disclosure) in the context of a CU mode may, additionally or alternatively, apply to PU. However, these HEVC-based examples should not be considered a restriction or limitation of the palette-based coding techniques described herein, as such techniques may be applied to work independently or as part of other existing or yet to be developed systems/standards. In these cases, the unit for palette coding can be square blocks, non-square, rectangular blocks or even regions of non-rectangular shape.

Palette-based encoding unit 122, for example, may perform palette-based decoding when a palette-based encoding mode is selected, e.g., for a CU or PU. For example, palette-based encoding unit 122 may be configured to generate a palette having entries indicating pixel values, select pixel values in a palette to represent pixel values of at least some positions of a block of video data, and signal information associating at least some of the positions of the block of video data with entries in the palette corresponding, respectively, to the selected pixel values. Although various functions are described as being performed by palette-based encoding unit 122, some or all of such functions may be performed by other processing units, or a combination of different processing units.

In some examples, according to aspects of this disclosure, palette-based encoding unit 122 may be configured to introduce a normative restriction for signaled bitstream escape pixel values (e.g. palette_escape_val), which may be signaled in the bitstream. This normative restriction may be defined, for example, by a bitstream constraint that a conformant bitstream may not contain an escape pixel value, e.g., palette_escape_val, greater than a certain value or be represented by more than a certain number of bins after entropy coding binarization, e.g., binarization for CABAC coding. In some examples, palette-based encoding unit 122 may impose the techniques of this disclosure using entropy encoding unit 118, described below.

For example, the number of bins may be restricted to be within 16 or 32 bins, or in general, to be any maximum number of bins which a particular video coding architecture can support. In some examples, the maximum number of bins may vary based on a particular level or profile associated with the video data being coded.

When the maximum value for an escape pixel value, e.g., palette_escape_val, that can be signaled in the bitstream is restricted, this may correspond to a limit on the number of bins in the syntax element representation (e.g., binarization). In another example, imposing a limit on the number of bins in the syntax element representation corresponds to a restriction on the maximum value for palette_escape_val that can be signaled in the bitstream.

Intra-prediction processing unit 126 may generate predictive data for a PU by performing intra prediction on the PU. The predictive data for the PU may include predictive blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the luma, Cb and Cr coding block of a CU and the selected predictive luma, Cb and Cr blocks of the PUs of the CU, a luma, Cb and Cr residual blocks of the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information; thus quantized transform coefficients may have lower precision than the original ones. In some examples, according to aspects of this disclosure, quantization unit 106 may apply the techniques described herein for determining a QP for escape pixels.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a residual quadtree (RQT) for a CU.

In some examples, according to aspects of this disclosure, palette-based encoding unit 122 and/or entropy encoding unit 118 may be configured to introduce a normative restriction for signaled bitstream escape pixel values (e.g. palette_escape_val) which may be signaled in the bitstream. This may be defined, for example, by a bitstream constraint that a conformant bitstream may not contain palette_escape_val greater than certain value or be represented by more than certain number of bins after the binarization. For example, encoder 20 may restrict the number of bins in one example to 16 bins, or in another example 32, or in general, to be any maximum number of bins which a particular architecture can support. Accordingly, encoder 20 may signal an escape value having no greater than a specific number of bins. Decoder 30 may be configured to receive a bitstream that is restricted in the manner described, and decoder 30 may decode the bitstream in accordance with the restrictions imposed by encoder 20.

When the maximum value for palette_escape_val that can be signaled in the bitstream is restricted, this may correspond to a limit on the number of bins in the syntax element representation (binarization). In another example, imposing a limit on the number of bins in the syntax element representation corresponds to a restriction on the maximum value for palette_escape_val that can be signaled in the bitstream. Although some aspects are described above with reference to palette_escape_val, in other examples in accordance with one or more aspects of the present disclosure, a restriction may be introduced that applies to quantized signal escape values, reconstructed escape values, unquantized escape values, and/or escape values in any other form.

Figure 3:
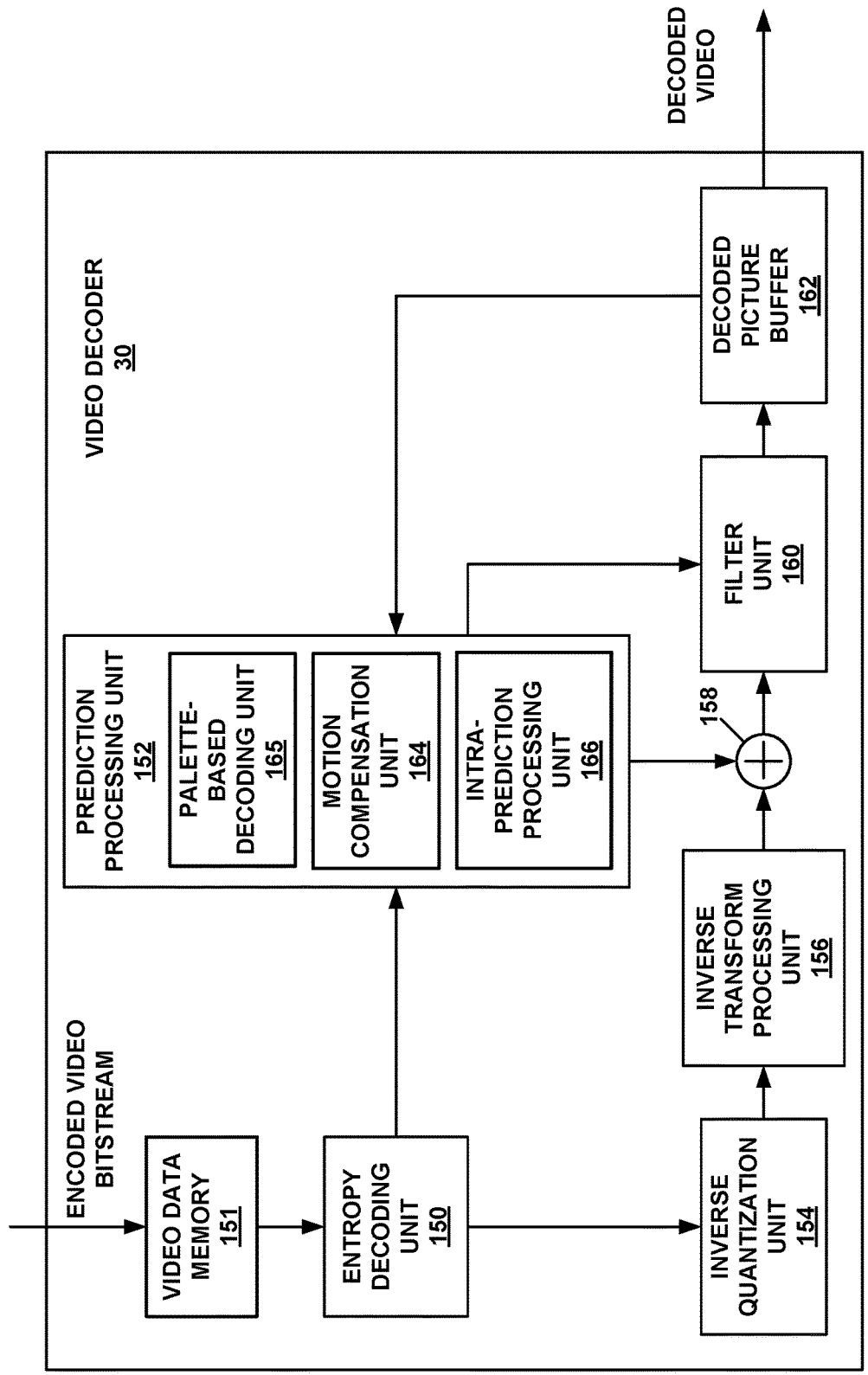
FIG. 3 is a block diagram illustrating an example video decoder that may implement the techniques described in this disclosure.

FIG. 3 is a block diagram illustrating an example video decoder 30 that is configured to implement the techniques of this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

Video decoder 30 represents an example of a device that may be configured to perform techniques for palette-based video coding in accordance with various examples described in this disclosure. For example, video decoder 30 may be configured to selectively decode various blocks of video data, such as CUs or PUs in HEVC coding, using either palette-based coding or non-palette based coding. Non-palette based coding modes may refer to various inter-predictive temporal coding modes or intra-predictive spatial coding modes, such as the various coding modes specified by HEVC. Video decoder 30, in one example, may be configured to generate a palette having entries indicating pixel values (e.g., based on signaled or predicted information in the bitstream), receive information associating at least some pixel locations in a block of video data with entries in the palette, select pixel values in the palette based on the information, and reconstruct pixel values of the block based on the selected pixel values in the palette.

In the example of FIG. 3, video decoder 30 includes an entropy decoding unit 150, video data memory 151, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. Video decoder 30 also includes a palette-based decoding unit 165 configured to perform various aspects of the palette-based coding techniques described in this disclosure. In other examples, video decoder 30 may include more, fewer, or different functional components.

Video data memory 151 may store video data, such as an encoded video bitstream, to be decoded by the components of video decoder 30. The video data stored in video data memory 151 may be obtained, for example, from a computer-readable medium, e.g., from a local video source, such as a camera, via wired or wireless network communication of video data, or by accessing physical data storage media. Video data memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes. Video data memory 151 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 151 and decoded picture buffer 162 may be provided by the same memory device or separate memory devices. In various examples, video data memory 151 may be on-chip with other components of video decoder 30, or off-chip relative to those components.

A coded picture buffer (CPB), e.g., formed by video data memory 151, may receive and store encoded video data (e.g., NAL units) of a bitstream. Entropy decoding unit 150 may receive encoded video data (e.g., NAL units) from the CPB and parse the NAL units to decode syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream.

The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice.

In addition to decoding syntax elements from the bitstream, video decoder 30 may perform a reconstruction operation on a non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed. In some examples, according to aspects of this disclosure, inverse quantization unit 154 may apply the techniques described herein for determining a QP for escape pixels.

After inverse quantization unit inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive luma, Cb and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may extract motion information for the PU. Motion compensation unit 164 may determine, based on the motion information of the PU, one or more reference regions for the PU. Motion compensation unit 164 may generate, based on samples blocks at the one or more reference blocks for the PU, predictive luma, Cb and Cr blocks for the PU.

Reconstruction unit 158 may use the luma, Cb and Cr transform blocks associated with TUs of a CU and the predictive luma, Cb and Cr blocks of the PUs of the CU, i.e., either intra-prediction data or inter-prediction data, as applicable, to reconstruct the luma, Cb and Cr coding blocks of the CU. For example, reconstruction unit 158 may add samples of the luma, Cb and Cr transform blocks to corresponding samples of the predictive luma, Cb and Cr blocks to reconstruct the luma, Cb and Cr coding blocks of the CU.

Filter unit 160 may perform a deblocking operation to reduce blocking artifacts associated with the luma, Cb and Cr coding blocks of the CU. Video decoder 30 may store the luma, Cb and Cr coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the luma, Cb, and Cr blocks in decoded picture buffer 162, intra prediction or inter prediction operations on PUs of other CUs.

Video decoder 30 may be configured to perform palette-based coding. Palette-based decoding unit 165, for example, may perform palette-based decoding when a palette-based decoding mode is selected, e.g., for a CU or PU. For example, palette-based decoding unit 165 may be configured to generate a palette having entries indicating pixel values, receive information associating at least some pixel locations in a block of video data with entries in the palette, select pixel values in the palette based on the information, and reconstruct pixel values of the block based on the selected pixel values in the palette. Although various functions are described as being performed by palette-based decoding unit 165, some or all of such functions may be performed by other processing units, or a combination of different processing units.

Palette-based decoding unit 165 may receive palette coding mode information, and perform the above operations when the palette coding mode information indicates that the palette coding mode applies to the block. When the palette coding mode information indicates that the palette coding mode does not apply to the block, or when other mode information indicates the use of a different mode, prediction processing unit 152 decodes the block of video data using a non-palette based coding mode, e.g., such an HEVC inter-predictive or intra-predictive coding mode. The block of video data may be, for example, a CU or PU generated according to an HEVC coding process. The palette-based coding mode may comprise one of a plurality of different palette-based coding modes, or there may be a single palette-based coding mode.

In some examples, according to aspects of this disclosure, palette-based decoding unit 165 and/or entropy decoding unit 150 may be configured to introduce a normative restriction for signaled bitstream escape pixel values (e.g. palette_escape_val) which may be signaled in the bitstream. This may be defined, for example, by a bitstream constraint that a conformant bitstream may not contain palette_escape_val greater than a certain value or be represented by more than certain number of bins after the binarization. For example, the number of bins may be restricted to be within 16 bins in one example, or 32 bins in another example, or in general, to be any maximum number of bins which a particular architecture can support.

When the maximum value for palette_escape_val that can be signaled in the bitstream is restricted, this may correspond to a limit on the number of bins in the syntax element representation (binarization) of the value. In another example, imposing a limit on the number of bins in the syntax element representation corresponds to a restriction on the maximum value for palette_escape_val that can be signaled in the bitstream.

In such an instance where the palette_escape_val is greater than the maximum allowed value, video decoder 30 may determine that an error has occurred. In such an example, a flag might be used to signal the error. Alternatively, in a further embodiment, the decoder 30 may consider the detected condition as an indication that byte alignment may have been lost and may discard all bitstream data until the detection of byte alignment at a later position in the bitstream.

In one example, video encoder 20, palette-based encoding unit 122 and/or entropy encoding unit 118 may encode escape pixel values based on a color component input bitdepth signaled in the bitstream. In such an example, escape values for a given color component may be restricted to fall within the range of 0 to (1<<bitdepth)−1, inclusive. In this equation, the bitdepth may be the bitdepth for the color component at issue. Such a bitdepth may be an input parameter to the encoder, it may be signaled in a sequence parameter set (SPS) in a bitstream generated by an encoder, or determined in another way. In other examples, video encoder 20 may encode escape pixel values so that they do not exceed a maximum value that is based on an output bitdepth (i.e., rather than an input bitdepth), or based on any internal bitdepth used by the encoder or decoder for processing. Video decoder 30, palette-based decoding unit 165, and/or entropy decoding unit 150 may receive the bitstream and decode the bitstream based on this restriction of escape pixel values.

In another example, video encoder 20, palette-based encoding unit 122 and/or entropy encoding unit 118 may encode escape pixel values based on a color component bitdepth corresponding to the maximum bitdepth supported by a codec (e.g., video encoder 20 or video decoder 30) for one or more color components (e.g., luma or chroma color components). In such an example, the bitdepth may correspond to the maximum supported bitdepth for one color component, or all color components for a certain profile, such as screen content coding profile, and/or certain levels. Video decoder 30, palette-based decoding unit 165, and/or entropy decoding unit 150 may receive the bitstream and decode the bitstream based on such a restriction of the escape pixel values. Although some examples have been described with reference to applying and/or enforcing a restriction on values of palette_escape_val, it should be understood that in other examples in accordance with one or more aspects of the present disclosure, a similar restriction may be applied to quantized signal escape values, reconstructed escape values, unquantized escape values, and/or escape values in any other form.

Other examples consider the effects of quantization on escape values or a maximum value for escape values. For instance, video encoder 20 and/or quantization unit 106 may quantize values, such as escape values, by dividing values by a quantization step size (qStep) and then rounding the result. Video decoder 30 and inverse quantization unit 154 may inverse quantize values by multiplying such values by the qStep value. The qStep value is determined as a function of the quantization parameter. Often, the qStep value may be greater than 1, so that quantization (e.g., dividing by qStep) may result in reducing the number of bits used to represent the quantized value, such as an escape value. However, for some quantization parameter values, qStep may be less than 1, which may mean that quantization does not reduce the number of bits used to represent an escape value, but rather, quantization expands or increases the number of bits used to represent the escape value. In other words, where qStep is less than 1, a quantization process that divides a value by qStep is effectively multiplying the value by a number greater than one.

Accordingly, in other examples, video encoder 20, palette-based encoding unit 122, entropy encoding unit 118, and/or quantization unit 106 may encode escape pixel values based not only on a color component bitdepth, but also based on the quantization parameter. For instance, video encoder 20, palette-based encoding unit 122 and/or entropy encoding unit 118 may determine a maximum value for escape pixel values, where the maximum value is determined based on both a component bitdepth and a quantization parameter. In one example, any increased accuracy resulting from quantization with a qStep less than 1 can be accommodated by restricting escape values for a given color component to fall within the range of 0 to $((1<<\text{bitdepth})-1)*k$, inclusive, where k is an expansion factor based on the quantization parameter and/or qStep value, and the bitdepth is the bitdepth for the color component at issue (or for another color component, or for all color components). In another example, any increased accuracy resulting from quantization can be accommodated by restricting escape values for a given color component to fall within the range of 0 to $((1<<\text{bitdepth+b})-1)$, inclusive, where b is an expansion factor based on the quantization parameter and/or qStep value, and the bitdepth is the bitdepth for the color component at issue (or for another color component, or for all color components). Video decoder 30, palette-based decoding unit 165, entropy decoding unit 150, and/or inverse quantization unit 154 may receive the bitstream and decode the bitstream based on the restriction of the escape pixel values.

In other examples, rather than accommodating the increased accuracy resulting from quantization with a qStep that is less than 1, video encoder 20 and/or quantization unit 106 may modify or restrict values of the quantization parameter to ensure that qStep values are not less than 1. As described above, where qStep is less than 1, quantization by video encoder 20 and/or quantization unit 106 may result in expansion of the value being quantized. In some cases, however, escape values coded in the bitstream may already represent the full precision of the escape value without any distortion or error. It may therefore be counterproductive to quantize an escape value with a qStep value less than one, since the full precision of the escape value may be already coded in the bitstream. Expanding such escape values might not provide any improvement in terms of increased accuracy of the code component values, and may undesirably increase the bitstream size.

Accordingly, in some examples, when encoding or decoding an escape value, the qStep value may be restricted so that it is not less than 1. Since the qStep value may be a function of the quantization parameter (QP), such a restriction can be performed in some examples by determining a lower bound for the QP, where the lower bound corresponds to a qStep value of 1, and where higher values of QP correspond to qStep values greater than 1. When encoding or decoding an escape value, the QP value can be restricted to be no less than the QP lower bound. In other words, before using a QP value in the quantization or inverse quantization processes for coding escape pixels, any QP values that are less than the lower bound may be modified to equal the lower bound, thereby ensuring the qStep is not less than 1. In such an example, video encoder 20 and/or quantization unit 106 may quantize values, such as escape values, by applying the modified QP, and video decoder 30 and inverse quantization unit 154 may inverse quantize values by applying the modified QP.

In another example, video encoder 20, palette-based encoding unit 122 and/or entropy encoding unit 118 may encode escape pixel values so that they are restricted to a maximum value that is based on precision information (e.g., the extended_precision_processing_flag), and also based on a color component bitdepth. Specific example calculations corresponding to such an example are further described below. Video decoder 30, palette-based decoding unit 165 and/or entropy decoding unit 150 may receive the bitstream and decode the bitstream according to the maximum value determined based on precision information (e.g., the extended_precision_processing_flag), and also based on the color component bitdepth.

In further examples, escape values can be treated as transform coefficients, and all restrictions imposed on transform coefficients may be applied to limit the value of escape values. In still further examples, the binarization of escape values may be controlled based on extended_precision_processing_flag. Depending on the value of extended_precision_processing_flag, the binarization of escape values may be derived differently. Specific examples corresponding to different binarization processes are further described below.

Figure 4:
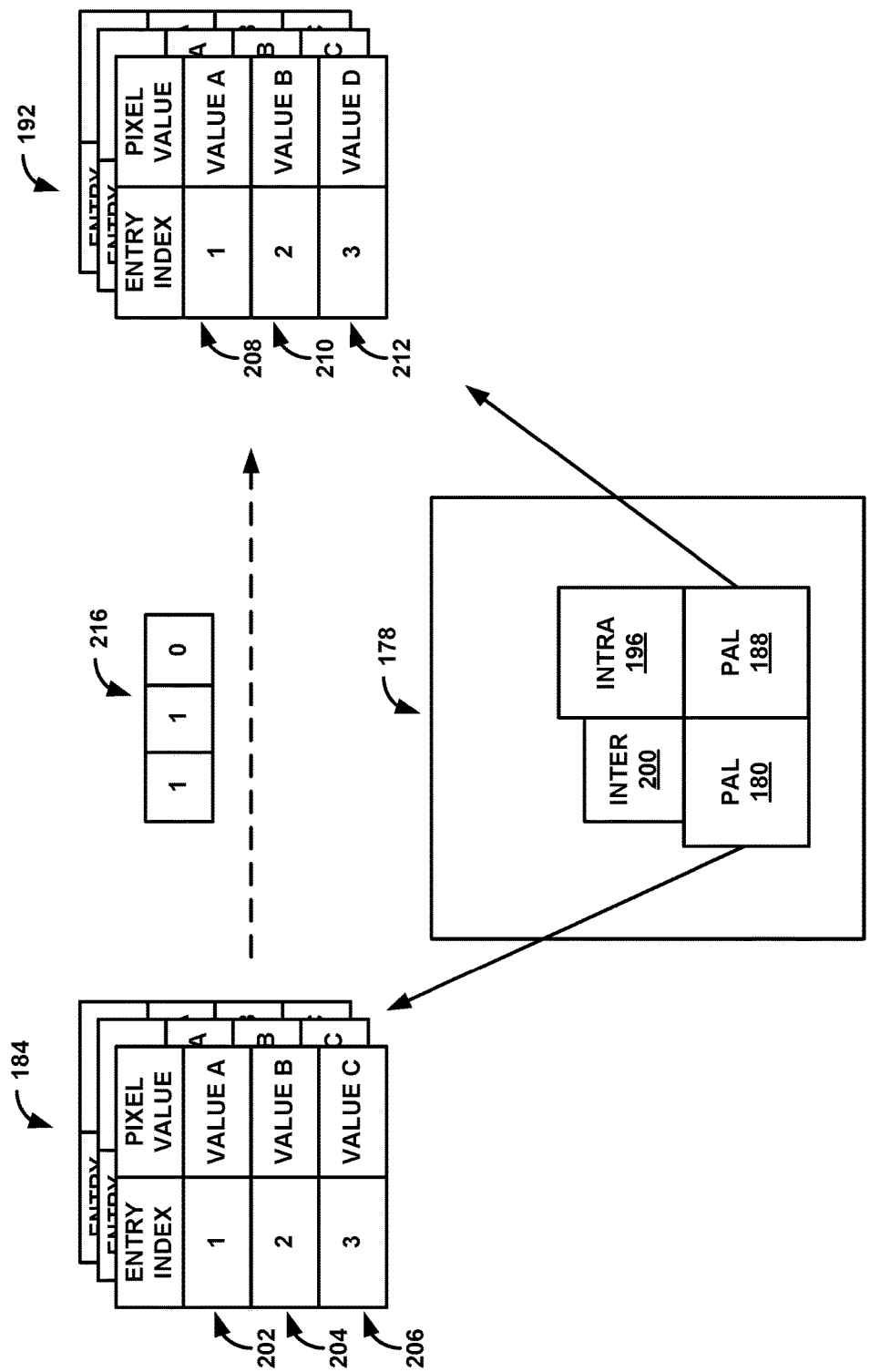
FIG. 4 is a conceptual diagram illustrating an example of determining palette entries for palette-based video coding, consistent with techniques of this disclosure.

FIG. 4 is a conceptual diagram illustrating an example of determining a palette for coding video data, consistent with techniques of this disclosure. The example of FIG. 4 includes a picture 178 having a first coding unit (CU) 180 that is associated with first palettes 184 and a second CU 188 that is associated with second palettes 192. First CU 180 and second CU 188 are coded using a palette mode (PAL). As described in greater detail below and in accordance with the techniques of this disclosure, second palettes 192 are based on first palettes 184. Picture 178 also includes block 196 coded with an intra-prediction coding mode and block 200 that is coded with an inter-prediction coding mode.

The techniques of FIG. 4 are described in the context of video encoder 20 (FIG. 1 and FIG. 2) and video decoder 30 (FIG. 1 and FIG. 3) and with respect to the HEVC video coding standard for purposes of explanation. However, it should be understood that the techniques of this disclosure are not limited in this way, and may be applied by other video coding processors and/or devices in other video coding processes and/or standards.

In general, a palette refers to a number of pixel values that are dominant and/or representative for a CU currently being coded, second CU 188 in the example of FIG. 4. First palettes 184 and second palettes 192 are shown as including multiple palettes. In some examples, according to aspects of this disclosure, a video coder (such as video encoder 20 or video decoder 30) may code palettes separately for each color component of a CU. For example, video encoder 20 may encode a palette for a luma (Y) component of a CU, another palette for a chroma (U) component of the CU, and yet another palette for the chroma (V) component of the CU. In this example, entries of the Y palette may represent Y values of pixels of the CU, entries of the U palette may represent U values of pixels of the CU, and entries of the V palette may represent V values of pixels of the CU.

In other examples, video encoder 20 may encode a single palette for all color components of a CU. In this example, video encoder 20 may encode a palette having an i-th entry that is a triple value, including Yi, Ui, and Vi. In this case, the palette includes values for each of the components of the pixels. Accordingly, the representation of first palettes 184 and second palettes 192 as a set of palettes having multiple individual palettes is merely one example and not intended to be limiting.

In the example of FIG. 4, each of first palettes 184 includes three entries 202-206 having entry index value 1, entry index value 2, and entry index value 3, respectively. Entries 202-206 relate the index values to pixel values including pixel value A, pixel value B, and pixel value C, respectively. As described herein, rather than coding the actual pixel values of first CU 180, a video coder (such as video encoder 20 or video decoder 30) may use palette-based coding to code the pixels of the block using the indices 1-3. That is, for each pixel position of first CU 180, video encoder 20 may encode an index value for the pixel, where the index value is associated with a pixel value in one or more of first palettes 184. Video decoder 30 may obtain the index values from a bitstream and reconstruct the pixel values using the index values and one or more of first palettes 184. Thus, first palettes 184 are transmitted by video encoder 20 in an encoded video data bitstream for use by video decoder 30 in palette-based decoding.

In some examples, video encoder 20 and video decoder 30 may determine second palettes 192 based on first palettes 184. For example, video encoder 20 and/or video decoder 30 may locate one or more blocks from which the predictive palettes, in this example, first palettes 184, are determined. The combination of entries being used for purposes of prediction may be referred to as a predictor palette.

In the example of FIG. 4, second palettes 192 include three entries 208-212 having entry index value 1, entry index value 2, and entry index value 3, respectively. Entries 208-212 relate the palette indices to pixel values including pixel value A, pixel value B, and pixel value D, respectively. In this example, video encoder 20 may code one or more syntax elements indicating which entries of first palettes 184 (representing a predictor palette, although the predictor palette may include entries of a number of blocks) are included in second palettes 192.

In the example of FIG. 4, the one or more syntax elements are illustrated as a vector 216. Vector 216 has a number of associated bins (or bits), with each bin indicating whether the palette predictor associated with that bin is used to predict an entry of the current palette. For example, vector 216 indicates that the first two entries of first palettes 184 (202 and 204) are included in second palettes 192 (a value of "1" in vector 216), while the third entry of first palettes 184 is not included in second palettes 192 (a value of "0" in vector 216). In the example of FIG. 4, the vector is a Boolean vector. The vector may be referred to as a palette prediction vector.

In some examples, video encoder 20 and video decoder 30 may determine a palette predictor list (which may also be referred to as a palette predictor table) when performing palette prediction. The palette predictor list may include entries from palettes of one or more neighboring blocks that are used to predict one or more entries of a palette for coding a current block. Video encoder 20 and video decoder 30 may construct the list in the same manner. Video encoder 20 and video decoder 30 may code data (such as vector 216) to indicate which entries of the palette predictor list are to be included in a palette for coding a current block.

Figure 5:
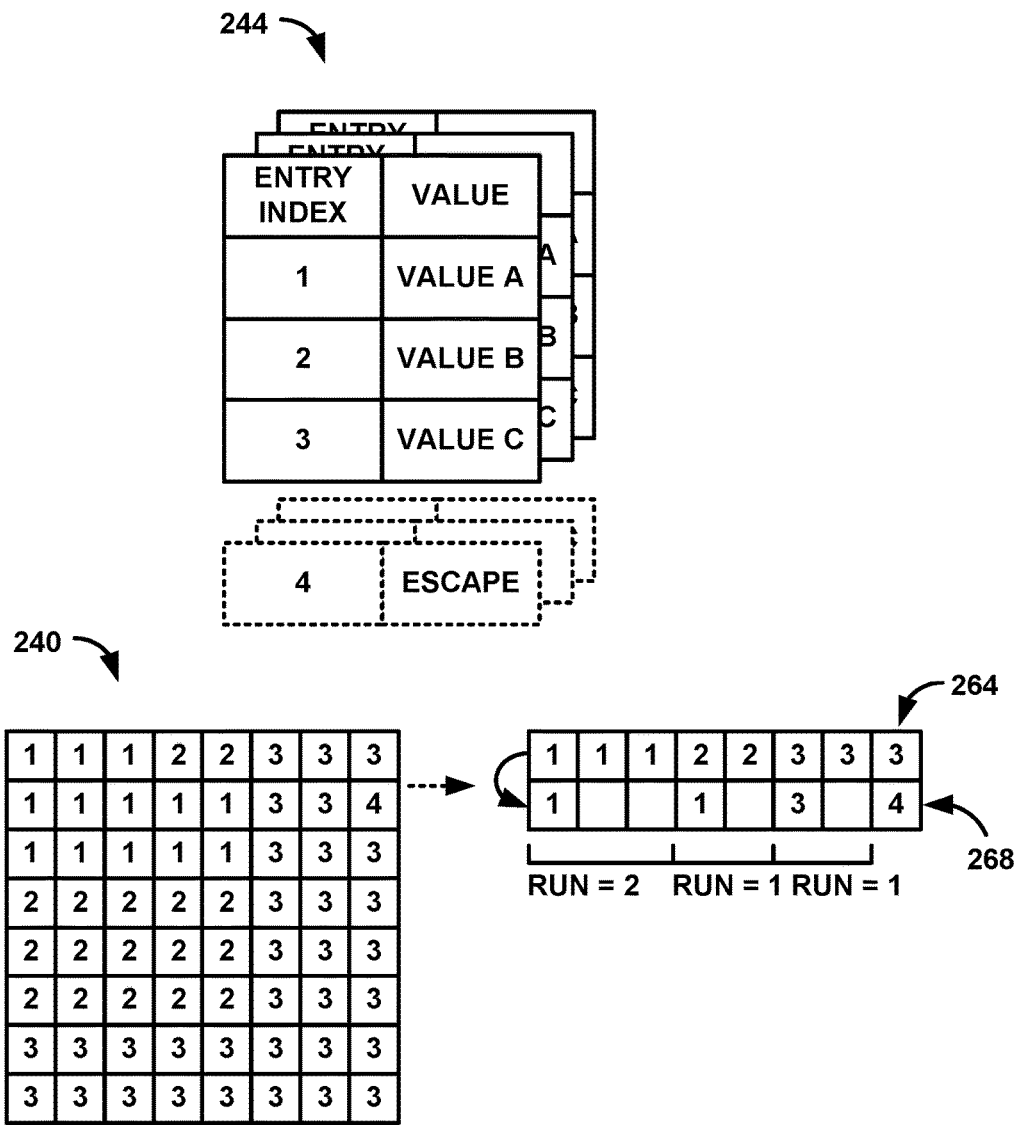
FIG. 5 is a conceptual diagram illustrating an example of determining indices to a palette for a block of pixels, consistent with techniques of this disclosure.

FIG. 5 is a conceptual diagram illustrating an example of determining palette indices to a palette for a block of pixels, consistent with techniques of this disclosure. For example, FIG. 5 includes a map 240 of palette indices that relate respective positions of pixels associated with the palette indices to an entry of palettes 244. For example, index 1 is associated with Value A, index 2 is associated with Value B, and index 3 is associated with Value C. In addition, when escape samples are indicated using implicit escape signaling, video encoder 20 and video decoder 30 may also add an additional index to palettes 244, illustrated in FIG. 5 as index 4, which may indicate that samples of map 240 associated with index 4 are escape samples. In this case, video encoder 20 may encode (and video decoder 30 may obtain, from an encoded bitstream) an indication of an actual pixel value (or its quantized version) for a position in map 240 if the pixel value is not included in palettes 244.

In some examples, video encoder 20 and video decoder 30 may be configured to code an additional map indicating which pixel positions are associated with palette indices. For example, assume that the (i, j) entry in the map corresponds to the (i, j) position of a CU. Video encoder 20 may encode one or more syntax elements for each entry of the map (i.e., each pixel position) indicating whether the entry has an associated index value. For example, video encoder 20 may encode a flag having a value of one to indicate that the pixel value at the (i, j) location in the CU is one of the values in palettes 244. Video encoder 20 may, in such an example, also encode a palette index (shown in the example of FIG.

5 as values 1-3) to indicate that pixel value in the palette and to allow video decoder to reconstruct the pixel value.

In instances in which palettes 244 include a single entry and associated pixel value, video encoder 20 may skip the signaling of the index value. Video encoder 20 may encode the flag to have a value of zero to indicate that the pixel value at the (i, j) location in the CU is not one of the values in palettes 244. In this example, video encoder 20 may also encode an indication of the pixel value for use by video decoder 30 in reconstructing the pixel value. For example, video encoder 20 may explicitly code the pixel value. In some instances, the pixel value may be coded in a lossy manner.

The value of a pixel in one position of a CU may provide an indication of values of one or more other pixels in other positions of the CU. For example, there may be a relatively high probability that neighboring pixel positions of a CU will have the same pixel value or may be mapped to the same index value (in the case of lossy coding, in which more than one pixel value may be mapped to a single index value).

Accordingly, video encoder 20 may encode one or more syntax elements indicating a number of consecutive pixels or palette indices in a given scan order that are coded together. As noted above, the string of palette indices (or pixel values indicated by the palette indices) may be referred to herein as a run. Video decoder 30 may obtain the syntax elements indicating a run from an encoded bitstream and use the data to determine the number of consecutive locations that have the same pixel or index value.

As noted above, runs may be used in conjunction with a Copy Top mode or Index mode. In an example for purposes of illustration, consider rows 264 and 268 of map 240. Assuming a horizontal, left to right scan direction, row 264 includes three palette indices of "1," two palette indices of "2," and three palette indices of "3." Row 268 includes five palette indices of "1," two palette indices of "3," and one sample that is not included in palettes 244 (represented by index 4), which may be referred to as an escape sample.

In this example, video encoder 20 may use Copy Top mode to encode data for row 268. For example, video encoder 20 may encode one or more syntax elements indicating that the first position of row 268 (the left most position of row 268) is the same as the first position of row 264. Video encoder 20 may also encode one or more syntax elements indicating that the next run of two consecutive entries in the scan direction in row 268 is the same as the first position of row 264.

After encoding the one or more syntax elements indicating the first position of row 264 and the run of two entries (noted above), video encoder 20 may encode the fourth and fifth positions in row 268 (from left to right), using Value mode. For example, video encoder 20 may encode one or more syntax elements indicating a value of 1 for the fourth position and one or more syntax elements indicating a run of 1 (e.g., Value mode). Hence, video encoder 20 encodes these two positions without reference to another line.

Video encoder 20 may then encode the first position having an index value of 3 in row 268 using Copy Top mode relative to upper row 264. For example, video encoder 20 may signal a Copy Top mode and a run of 1. Accordingly, video encoder 20 may select between coding pixel values or palette indices of a line relative to other values of the line, e.g., using a run, coding pixel values or palette indices of a line relative to values of another line (or column), or a combination thereof. Video encoder 20 may, in some examples, perform a rate/distortion optimization to make the selection.

Video encoder 20 may then encode the escape sample for the final sample of row 268 (from left to right), which is not included in palettes 244. For example, video encoder 20 may encode the final position of row 268 as an escape sample. That is, video encoder 20 may encode an indication that the final position of row 268 is an escape sample (e.g., index 4), as well as an indication of the sample value. Video decoder 30 may obtain the above-described syntax from an encoded bitstream and reconstruct row 268 using such syntax.

In one example, to signal or code an escape sample, video encoder 20 and video decoder 30 may add an additional index to palettes 244 (entry index 4). Video encoder 20 and video decoder 30 may use the additional index to palettes 244 to indicate that a sample is coded as an escape sample, e.g., index 4. The additional index, however, does not have an associated color value. Rather, video encoder 20 and video decoder 30 also code color values for each sample that is associated with the additional index. If the sample is not coded as an escape sample, video encoder 20 and video decoder 30 may code data to indicate whether the mode is Copy Top mode or Index mode, such as a palette_mode syntax element.

In some examples, video encoder 20 and video decoder 30 may be configured to code one or more block-level syntax elements that indicate, for all samples of a block of video data, whether at least one sample of the block is coded based on a color value not being included in a palette of colors for the block. With respect to the example of FIG. 5, video encoder 20 and video decoder 30 may code one or more syntax elements associated with map 240 that indicate that at least one sample of map 240 is coded as an escape sample, i.e., the final sample of row 268.

In an example, the one or more syntax elements may be a block-level escape flag. For example, video encoder 20 may encode an escape flag having a value of one to indicate that map 240 includes a sample coded as an escape sample. Likewise, video decoder 30 may decode an escape flag having a value of one, which indicates that map 240 includes a sample coded as an escape sample. Accordingly, video encoder 20 may encode and video decoder 30 may decode map 240 in accordance with the escape flag. For example, video encoder 20 and video decoder 30 may add index 4 to palettes 244, which may be used to represent samples coded as escape samples. Video encoder 20 and video decoder 30 may use this additional index during coding of map 240.

As an example, video decoder 30 may parse data for a palette coded block associated with map 240 from a bitstream. Video decoder 30 may decode a block-level escape flag for the block, which indicates whether one or more samples in the block may be coded as escape pixels. If the block-level escape flag indicates that there may be samples coded as escape samples, video decoder 30 may add index 4 to palettes 244. Video decoder 30 may also, for samples that are not coded in a run of other samples (e.g., samples being explicitly coded, such as those described above with respect to row 264 and row 268), decode one or more syntax elements that indicate a palette coding mode (e.g., such as a palette_mode flag).

In the example above, video decoder 30 may also decode a palette index for the samples. Video decoder 30 may use the decoded palette index to determine how to decode the sample value for the sample being decoded. For example, if the sample has an index of 4 (e.g., the index associated with escape samples), video decoder 30 may determine that the sample is an escape coded sample and may decode the sample value for the sample. If the sample has any index other than 4, video decoder 30 may determine the appropriate sample value from palettes 244 based on the decoded index. Video decoder 30 may also decode one or more syntax elements that indicate a run of other samples being coded with the current sample in a given scan order. Video decoder 30 may decode the index using a truncated binary code having an input parameter that is equal to the size of palettes 244, e.g., four indices. The resulting truncated binary code may include a prefix and a suffix (e.g., a trailing one or zero).

The techniques of the present disclosure may include normatively restricting the value of the palette_escape_val, which may be encoded in a bitstream (e.g., by video encoder 20) or decoded from an encoded bitstream (e.g., by video decoder 30). This restriction can be defined, for example, by a bitstream constraint that a conformant bitstream shall not contain palette_escape_val greater than a certain value or be represented by more than certain number of bins after the binarization.

Such a restriction may apply not only to signaled escape values (i.e., palette_escape_val), but also to quantized signal escape values, reconstructed escape values, unquantized escape values, and/or escape values in any other form. (Reconstructed escape values may be determined by applying inverse quantization to the quantized escape values.) For purposes of illustration, one or more techniques for restricting values may be described with reference to palette_escape_val or other values, but the same or similar techniques may be applied to other quantities, such as quantized signal escape values, reconstructed escape values, unquantized escape values, and/or escape values. Accordingly, any technique described herein for normatively restricting a value to a given maximum value may apply to not only to signaled escape values (i.e., palette_escape_val), but also to quantized signal escape values, reconstructed escape values, unquantized escape values, and/or escape values in any other form.

For example, the number of bins may be restricted to be within (i.e., less than or equal to) 16 bins, or within 32 bins, or in general, to be any maximum number of bins which a particular architecture can support.

When the maximum value for palette_escape_val that can be signaled in the bitstream is restricted, this corresponds to a limit on the number of bins in the syntax element representation (binarization). Alternatively, imposing a limit on the number of bins in the syntax element representation corresponds to a restriction on the maximum value for palette_escape_val that can be signaled in the bitstream.

The value of the palette_escape_val syntax element can be limited, for example, at least by one of the following:

Since the input bitdepth, which may be signaled in the sequence parameter set (SPS) per color component is known, the maximum possible value of the color component may be known as well. This maximum possible value of the color component may be calculated as $(1<<bitDepth)-1$, where bitDepth is the color component bitdepth and the '<<' operator represents an arithmetic left shift of a two's complement integer representation. The reconstructed escape coded sample color component value may range between 0 and $(1<<bitDepth)-1$, inclusive. So, the palette_escape_val, which may be a quantized representation of the escape pixel sample value, may be restricted to be within the same range as the input or reconstructed pixel values. In other words, a conformant bitstream may not contain palette_escape_val values greater than $(1<<bitDepth)-1$, where bitDepth is color component input bitdepth. In further examples, bitDepth may also be output bitdepth, or any internal bitdepth used for processing.

Additionally to that described above, the range of palette_escape_val may be extended to accommodate the accuracy increase when, for example, QP values are smaller than 4. In this case, the range of the palette_escape_val values can be defined between 0 and $((1<<bitDepth)-1)*k$, where k (>1) is the expansion factor. For example, palette_escape_val may be defined as 1/qStep0, where qStep0 is the quantization step for QP equal to 0. In an alternative example, palette_escape_val may be any other predefined QP value.

In another example, the range increase associated with certain QP values, such as where the QP is less than 4, may be addressed by restricting palette_escape_val values expressed to within the range between 0 and $(1<<(bitDepth+b))-1$, where b is a natural number representing, for example, the accuracy increase associated with 1/qStep0. In one example, the value of b is set equal to 1. In other examples, however, the value of b is set to another value.

Alternatively, in another example of the present disclosure, a similar quantization process may be used for transform coefficients as is applied to escape samples. In such an example, the syntax element palette_escape_val may be treated as a transform coefficient and restrictions which are imposed on transform coefficients may be applied to limit the signaled value of this syntax element. More specifically, in a further example, escape pixel coding can follow the transform skip portion of the transform coefficient coding, where all aspects of the process are borrowed, such as including the restriction on the magnitude, signaling, and binarization optionally with using same Rice parameter adaptation. In some examples, only some aspects of the process are borrowed; in one example, for instance, only the restriction on the magnitude is reused. In another example, the binarization used for coefficient coding is used along with the magnitude restriction. The fixed Rice parameter may be used instead of adaptation of the Rice parameter. In another example, the fixed Rice parameter used may be 3. In alternative examples, the fixed Rice parameter may be greater or less than 3.

In an example, the variables $Palette\_escape\_val\_Min_Y$, $Palette\_escape\_val\_Min_C$, $Palette\_escape\_val\_Max_Y$ and $Palette\_escape\_val\_Max_C$ may be derived as follows:

$Palette\_escape\_val\_Min_Y=-(1<<(extended\_precision\_processing\_flag? Max(15, BitDepthY+6): 15))$ $Palette\_escape\_val\_Min_C=-(1<<(extended\_precision\_processing\_flag? Max(15, BitDepthC+6): 15))$ $Palette\_escape\_val\_Max_Y=(1<<(extended\_precision\_processing\_flag? Max(15, BitDepthY+6): 15))-1$ $Palette\_escape\_val\_Max_C=(1<<(extended\_precision\_processing\_flag? Max(15, BitDepthC+6): 15))-1$ where the statement x?y:z, represents if x is TRUE or not equal to 0, and the statement evaluates to the value of y; otherwise, the statement evaluates to the value of z. The extended_precision_processing_flag is set to TRUE when an extended dynamic range is used and FALSE when it is not used.

In an example of the present disclosure, encoder 20 may constrain the value of the syntax element PaletteEscapeVal [cIdx][xC][yC] to be in the range of $Palette\_escape\_val\_Min_Y$ to $Palette\_escape\_val\_Max_Y$, inclusive, for cIdx equal to 0, and in the range of $Palette\_escape\_val\_Min_C$ to $Palette\_escape\_val\_Max_C$, inclusive, for cIdx not equal to 0. PaletteEscapeVal[cIdx][xC][yC] specifies an escape value of a sample for which PaletteIndexMap[xC][yC] (which specifies a palette index, which is an index to the array represented by CurrentPaletteEntries[cIdx][i], which specifies the i-th element in the current palette) is equal to MaxPaletteIndex (which specifies the maximum possible value for a palette index for the current coding unit) and palette_escape_val_present_flag is equal to 1. The array index cIdx specifies the color component. The array index cIdx may specify the color component. The array indices xC and yC may specify the location (xC, yC) of the sample relative to the top-left luma sample of the picture. Decoder 30 may receive a bitstream subject to constraints imposed by an encoder, and decoder 30 may reconstruct the PaletteEscapeVal[cIdx][xC][yC] based on the constraints.

In an alternative example, encoder 20 may restrict the range of palette_escape_val or PaletteEscapeVal[cIdx][xC][yC] to the range from 0 to (1<<bitDepthMax)−1, inclusive. bitDepthMax may be the maximum bitdepth, for example maximum bitdepth supported by a codec for luma or chroma components or both, for example, bitDepthMax values such as 8, 9, 10, 11, 12, 13, 14, 15, 16, etc. In one example, bitDepthMax can be a maximum supported bitdepth among all color components for a certain profile, such as screen content coding (SCC) profile, and/or certain levels. In another example, bitDepthMax is always equal to 15.

In a further example of the present disclosure, the value of PaletteEscapeVal[cIdx][xC][yC] may be constrained in the range of 0 to (1<<bitdepthMax)−1, inclusive, for cIdx equal to 0, and in the range of 0 to (1<<bitdepthMax)−1, inclusive, for cIdx not equal to 0.

In an alternative example, the range of palette_escape_val or PaletteEscapeVal[cIdx][xC][yC] is restricted to the range from 0 to (1<<(extended_precision_processing_flag? Max (15, BitDepth+6): 15))−1, inclusive. The range may be based on the bitdepth and an extended_precision_processing_flag as defined below:

The variables Palette_escape_val_Min$_Y$, Palette_escape_val_Min$_C$, Palette_escape_val_Max$_Y$ and Palette_escape_val_Max$_C$ may be derived as follows:
Palette_escape_val_MinY=0
Palette_escape_val_MinC=0
Palette_escape_val_MaxY=(1<<(extended_precision_processing_flag? Max(15, BitDepthY+6): 15))−1
Palette_escape_val_MaxC=(1<<(extended_precision_processing_flag? Max(15, BitDepthC+6): 15))−1

In a further example, the value of PaletteEscapeVal[cIdx][xC][yC] may be constrained in the range of Palette_escape_val_Min$_Y$ to Palette_escape_val_Max$_Y$, inclusive, for cIdx equal to 0, and in the range of Palette_escape_val_Min$_C$ to Palette_escape_val_Max$_C$, inclusive, for cIdx not equal to 0.

In a further alternative example, the binarization of palette_escape_val is controlled based on an extended_precision_processing_flag as below:

In an example where the extended_precision_processing_flag is equal to 0, the binarization of palette_escape_val may be derived by invoking the k-th order Exponential-Golomb (EGk) binarization process. In an example, k may be set equal to 3. In an alternative example, k may be set to any value, e.g., 0, 1, 2, 3, 4, 5, 6, etc.

In an example where the extended_precision_processing_flag is equal to 1, the binarization of palette_escape_val is derived by invoking the limited k-th order EGk binarization process. In an exemplary example, the binarization of palette_escape_val is performed with the variable riceParam set equal to 3 and the color component cIdx. For example, the binarization process utilized may be the k-th order Exp-Golomb (EGk) binarization process and/or the Limited k-th order Exp-Golomb (EGk) binarization process as described in Rajan Joshi et al., "High Efficiency Video Coding (HEVC) Screen Content Coding: Draft 4," JCTVC-U1005, Warsaw, PL, 19 Jun.-26 Jun. 2015.

A quantization parameter (QP) smaller than 4, in certain examples of the present disclosure, may pose the problem of value expansion. In such an example, when QP is equal to 4, nominally the corresponding quantizer step-size (qStep) is equal to 1. When QP is less than 4, however, instead of quantizing the input value, the quantization process is expanding the input value, i.e., dividing it by qStep<1. This may be used to increase the accuracy of the transform coefficients. However, in certain examples, escape coded pixels with qStep equal to 1 already represent the full precision of the input value without any distortion or error. Thus, in such examples, further expansion may merely waste memory.

In one example, which may address value expansion associated with certain QP values, in an example where QP values are smaller than 4, the QP value can be clipped to be within the desired QP values range for escape pixels. In such an example, for example, the lower bound of the desired QP values range used, in this case, for quantization and inverse quantization processes may be set equal to 4. Thus, before using the QP value in the quantization or inverse quantization processes for the escape pixel coding or transform skip, the QP value may be clipped first to be within the desired QP range. For example, if a QP value equal to 0 is used, the QP value may be first clipped to the value of 4 and after that the clipped QP value is used in related coding or decoding processes. It should be noted that for bitdepths other than 8, the QP which may be considered equivalent to 4 may be specified by 4-6*(bitDepth−8). For bitdepth of 10, the QP value may be clipped from below to a value of −8. In an example, lower QP values may be clipped to a QP value that nominally corresponds to a qStep of 1.

In a further example, the restriction of QP range is also applicable to transform skip, i.e., a process to bypass a transformation step of transform processing unit 104.

Figure 6:
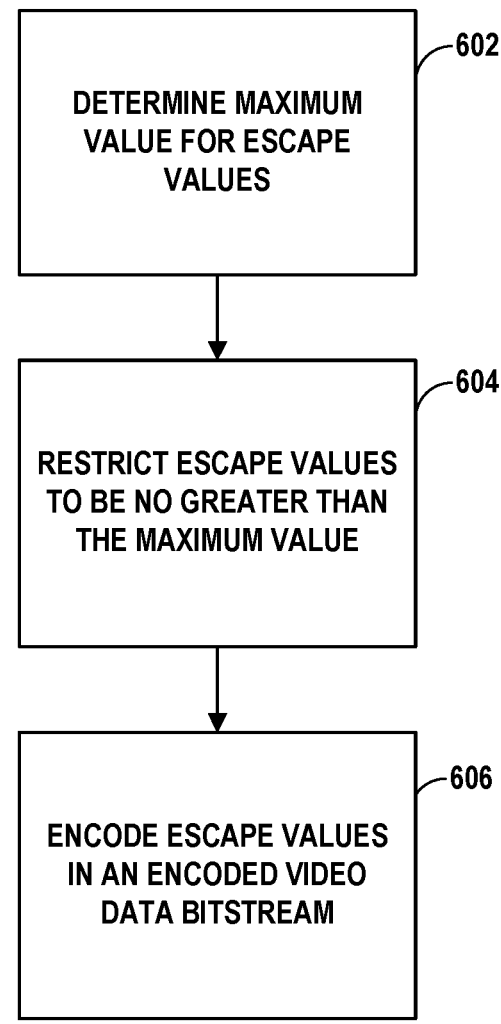
FIG. 6 is a flow chart illustrating an example encoding process in which escape pixel values are restricted in accordance with one or more aspects of the present disclosure.

FIG. 6 is a flow chart illustrating an example encoding process in which escape pixel values are restricted in accordance with one or more aspects of the present disclosure. The process of FIG. 6 is generally described as being performed by video encoder 20 for purposes of illustration, although any one or more of a variety of other processors may also carry out the process shown in FIG. 6.

In the example of FIG. 6, video encoder 20 may determine a maximum value for escape values used in a palette mode for encoding the video data, wherein the escape values represent samples in a block of the video data to be encoded (602). For example, video encoder 20 may determine, based on the signaled input bitdepth for a luma or chroma component, a maximum value for escape values. In another example, video encoder 20 may determine a maximum value for escape values based on the maximum bitdepth supported by the encoder.

Video encoder 20 may restrict one or more escape values to be no greater than the maximum value (604). For instance, video encoder 20 may normatively restrict one or more escape values so that the value of the reconstructed escape value determined based on the signaled palette_escape_val is less than or equal to the determined maximum value. Video encoder 20 may encode escape values in an encoded video data bitstream (606).

Figure 7:
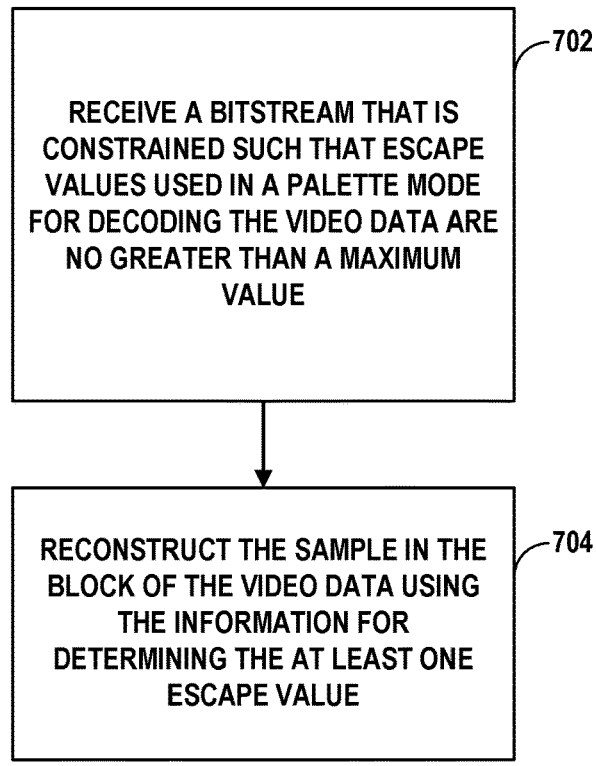
FIG. 7 is a flow chart illustrating an example decoding process in which escape pixel values are restricted in accordance with one or more aspects of the present disclosure.

FIG. 7 is a flow chart illustrating an example decoding process in which escape pixel values are restricted in accordance with one or more aspects of the present disclosure. The process of FIG. 7 is generally described as being performed by video decoder 30 for purposes of illustration, although any one or more of a variety of other processors may also carry out the process shown in FIG. 7.

In the example of FIG. 7, video decoder 30 may receive a bitstream that is constrained such that escape values used in a palette mode for decoding the video data are no greater than a maximum value, wherein the bitstream includes information for determining at least one escape value representing a sample in a block of the video data to be decoded (702). For instance, video decoder 30 may receive a bitstream that is constrained so that escape values are no greater than a maximum value determined based on the signaled input bitdepth for a luma or chroma component. In another example, video decoder 30 may receive a bitstream that is constrained so that escape values are no greater than a maximum value determined based on the maximum bitdepth supported by video encoder 20 and/or video decoder 30.

Video decoder 30 may reconstruct the sample in the block of the video data using the information for determining the at least one escape value (704). For example, video decoder 30 may determine escape values from the bitstream based on a signaled maximum bitdepth and reconstruct the sample. In another example, video decoder 30 may determine escape values from the bitstream based on the maximum bitdepth supported by the encoder and/or decoder.

Figure 8:
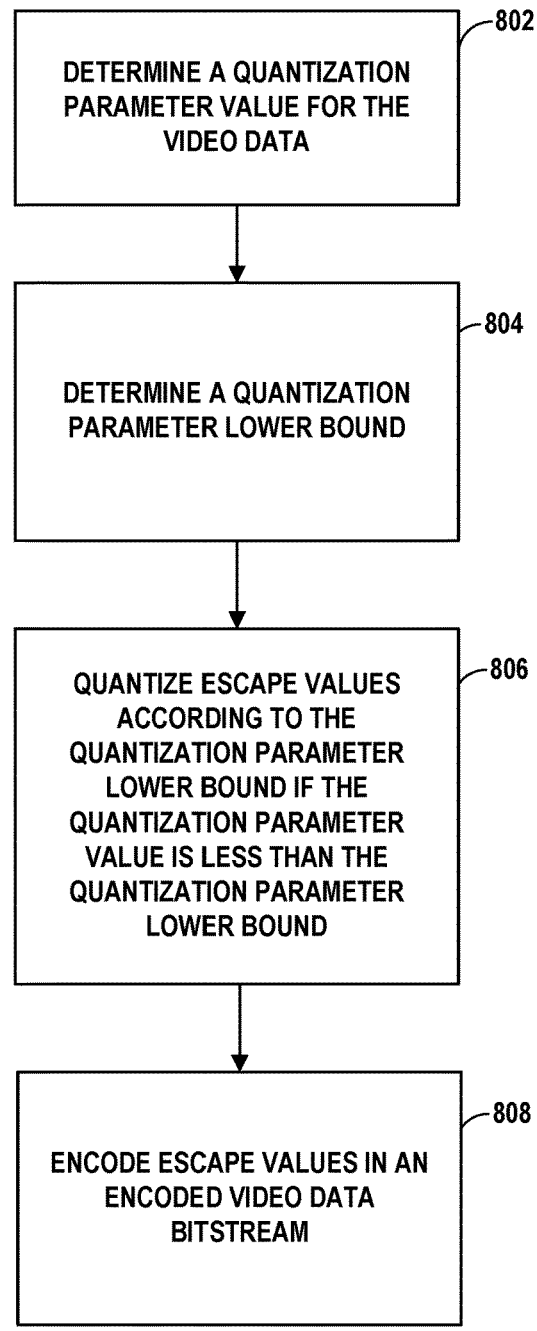
FIG. 8 is a flow chart illustrating an example encoding process in which a lower bound is applied to a quantization parameter in accordance with one or more aspects of the present disclosure.

FIG. 8 is a flow chart illustrating an example encoding process in which a lower bound is applied to a quantization parameter in accordance with one or more aspects of the present disclosure. The process of FIG. 8 is generally described as being performed by video encoder 20 for purposes of illustration, although any one or more of a variety of other processors may also carry out the process shown in FIG. 8.

In the example of FIG. 8, video encoder 20 may determine a quantization parameter value for the video data (802). For example, video encoder 20 may determine, based on a setting used by video encoder 20 and/or based on the content to be encoded, a quantization parameter value.

Video encoder 20 may determine a quantization parameter lower bound (804). For example, video encoder 20 may determine the quantization parameter that corresponds to a qStep of 1, and video encoder 20 may choose that quantization parameter as the lower bound. In some examples, the video encoder 20 may determine a quantization parameter of 4 as a lower bound for the quantization parameter.

Video encoder 20 may quantize escape values used in a palette mode for encoding the video data according to the quantization parameter lower bound if the quantization parameter value is less than the quantization parameter lower bound, wherein the escape values represent samples in a block of the video data to be encoded (806). For example, where the lower bound is determined to be 4, video encoder 20 may, if a quantization parameter less than 4 is encountered, modify or clip the quantization parameter to the value of 4 before using the quantization parameter in quantization processes for escape values or for transform skip. Video encoder 20 may encode escape values in an encoded video data bitstream (808).

Figure 9:
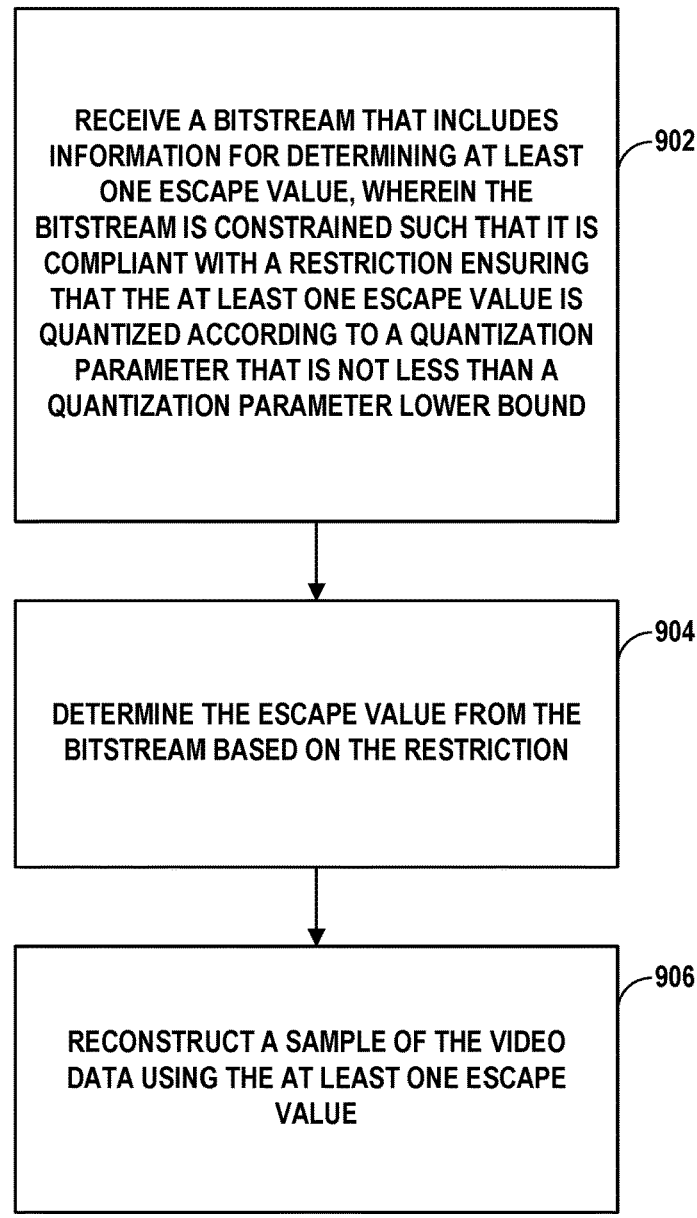
FIG. 9 is a flow chart illustrating an example decoding process in which a lower bound is applied to a quantization parameter in accordance with one or more aspects of the present disclosure.

FIG. 9 is a flow chart illustrating an example decoding process in which a lower bound is applied to a quantization parameter in accordance with one or more aspects of the present disclosure. The process of FIG. 9 is generally described as being performed by video decoder 30 for purposes of illustration, although any one or more of a variety of other processors may also carry out the process shown in FIG. 9.

In the example of FIG. 9, video decoder 30 may receive a bitstream that includes information for determining at least one escape value used in a palette mode for decoding the video data, wherein the bitstream is constrained such that it is compliant with a restriction ensuring that the at least one escape value is quantized according to a quantization parameter that is not less than a quantization parameter lower bound (902). For example, video decoder 30 may receive a bitstream that is constrained so that escape values are quantized with a quantization parameter no less than that which corresponds to a qStep of 1. In some examples, such as for bitdepth values equal to 8, the quantization parameter lower bound may be 4. Accordingly, in such an example, video decoder 30 may receive a bitstream that is constrained so that escape values are quantized with a quantization parameter no less than 4.

Video decoder 30 may determine the at least one escape value from the bitstream based on the restriction (904). For example, video decoder 30 may decode escape values from a bitstream that has been restricted so that escape values are quantized with a quantization parameter no less than 4. Video decoder 30 may reconstruct a sample of the video data using the at least one escape value (906).

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically might be alternatively not performed automatically, but rather, such operations, acts, steps, or events might be, in some examples, performed in response to input or another event.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

Certain aspects of this disclosure have been described with respect to the developing HEVC standard for purposes of illustration. However, the techniques described in this disclosure may be useful for other video coding processes, including other standard or proprietary video coding processes not yet developed.

The techniques described above may be performed by video encoder 20 (FIGS. 1 and 2) and/or video decoder 30 (FIGS. 1 and 3), both of which may be generally referred to as a video coder. Likewise, video coding may refer to video encoding or video decoding, as applicable.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

What is claimed is:

1. A method of decoding video data comprising:
   receiving, by a decoding apparatus, a bitstream that is constrained such that escape values used in a palette mode for decoding the video data are no greater than a maximum value, wherein the maximum value is calculated according to $(1<<(n+b))-1$, wherein n is the component bitdepth and b is an integer, and wherein the bitstream includes information for determining at least one escape value representing a sample in a block of the video data to be decoded; and
   reconstructing, by the decoding apparatus, the sample in the block of the video data using the information for determining the at least one escape value.

2. The method of claim 1, wherein the escape values used in the palette mode comprise escape values signaled in the bitstream.

3. The method of claim 1, wherein the at least one escape value is not associated with any entry in a palette used to represent samples in the block of the video data.

4. The method of claim 1, wherein the component bitdepth is a color component input bitdepth.

5. The method of claim 1, further comprising:
   receiving the component bitdepth signaled in the bitstream.

6. The method of claim 1, further comprising:
   receiving the component bitdepth signaled in a sequence parameter set.

7. The method of claim 1, wherein the maximum value is calculated according to $(1<<n)-1$.

8. The method of claim 1, wherein b is equal to 1.

9. The method of claim 1, wherein the component bitdepth is a maximum bitdepth supported by a decoder.

10. The method of claim 1, wherein the maximum value is further based on a quantization parameter value.

11. The method of claim 1, wherein the maximum value is determined by imposing on the escape values restrictions also imposed on transform coefficients.

12. The method of claim 1, wherein the maximum value is further based on precision information.

13. The method of claim 12, wherein the precision information includes an extended_precision_processing_flag.

14. The method of claim 12, further comprising:
    deriving, based on at least the precision information, binarization of the escape values by invoking a Exp-Golomb binarization process.

15. The method of claim 1, wherein the decoding apparatus is a mobile computing device.

16. A method of encoding video data comprising:
    determining, by an encoding apparatus and based on at least a component bitdepth, a maximum value for escape values used in a palette mode for encoding the video data, wherein the maximum value is determined according to $(1<<(n+b))-1$, wherein n is the component bitdepth and b is an integer, and wherein the escape values represent samples in a block of the video data to be encoded;
    restricting, by the encoding apparatus, one or more escape values to be no greater than the maximum value; and encoding, by the encoding apparatus, the one or more escape values in an encoded video data bitstream.

17. The method of claim 16, wherein the escape values used in the palette mode comprise escape values signaled in the encoded video data bitstream.

18. The method of claim 16, wherein the one or more escape values are not associated with any entry in a palette used to represent samples in the block of the video data.

19. The method of claim 16, wherein the component bitdepth is a color component input bitdepth.

20. The method of claim 16, further comprising:
signaling the component bitdepth.

21. The method of claim 16, further comprising:
signaling the component bitdepth in a sequence parameter set.

22. The method of claim 16, wherein determining the maximum value comprises:
determining the maximum value according to $(1<<n)-1$.

23. The method of claim 16, wherein b is equal to 1.

24. The method of claim 16, wherein the component bitdepth is a maximum bitdepth supported by an encoder.

25. The method of claim 16, wherein determining the maximum value comprises:
determining, further based on a quantization parameter value, the maximum value for escape values.

26. The method of claim 16, wherein determining the maximum value comprises:
imposing on the escapes values restrictions also imposed on transform coefficients.

27. The method of claim 16, wherein determining the maximum value comprises:
determining, further based on precision information, the maximum value for the escape values.

28. The method of claim 27, wherein the precision information includes an extended_precision_processing_flag.

29. The method of claim 27, further comprising:
deriving, based at least on the precision information, binarization of the escape values by invoking a Exp-Golomb binarization process.

30. A method of decoding video data comprising:
receiving, by a decoding apparatus, a bitstream that includes information for determining at least one escape value used in a palette mode for decoding the video data, wherein the bitstream is constrained such that it is compliant with a restriction ensuring that the at least one escape value is quantized according to a quantization parameter that is not less than a quantization parameter lower bound, and wherein the bitstream is further constrained such that escape values used in the palette mode for decoding the video data are no greater than a maximum value, wherein the maximum value is based on at least a component bitdepth, wherein the maximum value is calculated according to $(1<<(n+b))-1$, and wherein n is the component bitdepth and b is an integer;
determining, by the decoding apparatus, the at least one escape value from the bitstream based on the restriction; and
reconstructing, by the decoding apparatus, a sample of the video data using the at least one escape value.

31. The method of claim 30, wherein the at least one escape value is not associated with any entry in a palette used to represent samples in a block of video data to be decoded.

32. The method of claim 30, wherein the quantization parameter lower bound corresponds to a qStep value of 1.

33. The method of claim 30, wherein the quantization parameter lower bound is based on a component bitdepth.

34. The method of claim 33, wherein the quantization parameter lower bound is equal to 4 when the component bitdepth on which the quantization parameter lower bound is based is 8.

35. The method of claim 30, wherein the decoding apparatus is a mobile computing device.

36. A method of encoding video data comprising:
determining, by an encoding apparatus, a quantization parameter value for the video data;
determining, by the encoding apparatus, a quantization parameter lower bound;
quantizing, by the encoding apparatus, escape values used in a palette mode for encoding the video data according to the quantization parameter lower bound if the quantization parameter value is less than the quantization parameter lower bound, wherein the escape values represent samples in a block of the video data to be encoded;
determining, by the encoding apparatus and based on at least a component bitdepth, a maximum value for the escape values, wherein the maximum value is determined according to $(1<<(n+b))-1$, and wherein n is the component bitdepth and b is an integer;
restricting, by the encoding apparatus, one or more escape values to be no greater than the maximum value; and
encoding, by the encoding apparatus, the escape values in an encoded video data bitstream.

37. The method of claim 36, wherein the escape values are not associated with any entry in a palette used to represent sample values of the block of the video data.

38. The method of claim 36, wherein determining the quantization parameter lower bound comprises:
choosing the quantization parameter lower bound that corresponds to a qStep value of 1.

39. The method of claim 36, wherein determining the quantization parameter lower bound comprises:
determining the quantization parameter lower bound based on a component bitdepth.

40. The method of claim 39, wherein determining the quantization parameter lower bound comprises:
choosing the quantization parameter lower bound equal to 4 when the component bitdepth on which the quantization lower bound is based is 8.

41. An apparatus configured to decode video data, the apparatus comprising:
a memory configured to store the video data; and
one or more processors configured to:
receive a bitstream that is constrained such that escape values used in a palette mode for decoding the video data are no greater than a maximum value, wherein the maximum value is based on at least a component bitdepth, wherein the maximum value is calculated according to $(1<<(n+b))-1$, wherein n is the component bitdepth and b is an integer, and wherein the bitstream includes information for determining at least one escape value representing a sample in a block of the video data to be decoded, and
reconstruct the sample in the block of the video data using the information for determining the at least one escape value.

42. The apparatus of claim 41, wherein the escape values used in the palette mode comprise escape values signaled in the bitstream.

43. The apparatus of claim 41, wherein the at least one escape value is not associated with any entry in a palette used to represent samples in the block of the video data.

44. The apparatus of claim 41, wherein the component bitdepth is a color component input bitdepth.

45. The apparatus of claim 41, wherein the one or more processors are further configured to:
receiving the component bitdepth signaled in the bitstream.

46. The apparatus of claim 41, wherein the one or more processors are further configured to:
receive the component bitdepth signaled in a sequence parameter set.

47. The apparatus of claim 41, wherein the maximum value is calculated according to $(1<<n)-1$.

48. The apparatus of claim 41, wherein b is equal to 1.

49. The apparatus of claim 41, wherein the component bitdepth is a maximum bitdepth supported by a decoder.

50. The apparatus of claim 41, wherein the maximum value is further based on quantization parameter value.

51. The apparatus of claim 41, wherein the maximum value is determined by imposing on the escape values restrictions also imposed on transform coefficients.

52. The apparatus of claim 41, wherein the maximum value is further based on precision information.

53. The apparatus of claim 52, wherein the precision information includes an extended_precision_processing_flag.

54. The apparatus of claim 52, wherein the one or more processors are further configured to:
derive, based on at least the precision information, binarization of the escape values by invoking a Exp-Golomb binarization process.

55. The apparatus of claim 41, wherein the apparatus is a mobile computing device.

56. An apparatus configured to encode video data, the apparatus comprising:
a memory configured to store the video data; and
one or more processors configured to:
determine, based on at least a component bitdepth, a maximum value for escape values used in a palette mode for encoding the video data, wherein the maximum value is determined according to $(1<<(n+b))-1$, wherein n is the component bitdepth and b is an integer, and wherein the escape values represent samples in a block of the video data to be encoded,
restrict one or more escape values to be no greater than the maximum value, and
encode the one or more escape values in an encoded video data bitstream.

57. The apparatus of claim 56, wherein the escape values used in the palette mode comprise escape values signaled in the encoded video data bitstream.

58. The apparatus of claim 56, wherein the one or more escape values are not associated with any entry in a palette used to represent samples in the block of the video data.

59. The apparatus of claim 56, wherein the component bitdepth is a color component input bitdepth.

60. The apparatus of claim 56, wherein the one or more processors are further configured to:
signal the component bitdepth.

61. The apparatus of claim 56, wherein the one or more processors are further configured to:
signal the component bitdepth in a sequence parameter set.

62. The apparatus of claim 56, wherein determining the maximum value comprises:
determine the maximum value according to $(1<<n)-1$.

63. The apparatus of claim 56, wherein b is equal to 1.

64. The apparatus of claim 56, wherein the component bitdepth is a maximum bitdepth supported by an encoder.

65. The apparatus of claim 56, wherein determining the maximum value comprises:
determining, further based on a quantization parameter value, the maximum value for escape values.

66. The apparatus of claim 56, wherein determining the maximum value comprises:
imposing on the escapes values restrictions also imposed on transform coefficients.

67. The apparatus of claim 56, wherein determining the maximum value comprises:
determining, further based on precision information, the maximum value for the escape values.

68. The apparatus of claim 67, wherein the precision information includes an extended_precision_processing_flag.

69. The apparatus of claim 67, wherein the one or more processors are further configured to:
derive, based at least on the precision information, binarization of the escape values by invoking a Exp-Golomb binarization process.

70. An apparatus configured to decode video data, the apparatus comprising:
a memory configured to store the video data; and
one or more processors configured to:
receive a bitstream that includes information for determining at least one escape value used in a palette mode for decoding the video data, wherein the bitstream is constrained such that it is compliant with a restriction ensuring that the at least one escape value is quantized according to a quantization parameter that is not less than a quantization parameter lower bound, and wherein the bitstream is further constrained such that escape values used in the palette mode for decoding the video data are no greater than a maximum value, wherein the maximum value is based on at least a component bitdepth, wherein the maximum value is calculated according to $(1<<(n+b))-1$, and wherein n is the component bitdepth and b is an integer,
determine the at least one escape value from the bitstream based on the restriction, and
reconstruct a sample of the video data using the at least one escape value.

71. The apparatus of claim 70, wherein the at least one escape value is not associated with any entry in a palette used to represent samples in a block of video data to be decoded.

72. The apparatus of claim 70, wherein the quantization parameter lower bound corresponds to a qStep value of 1.

73. The apparatus of claim 70, wherein the quantization parameter lower bound is based on a component bitdepth.

74. The apparatus of claim 73, wherein the quantization parameter lower bound is equal to 4 when the component bitdepth on which the quantization parameter lower bound is based is 8.

75. The apparatus of claim 70, wherein the apparatus is a mobile computing device.

76. An apparatus configured to encode video data, the apparatus comprising:
a memory configured to store the video data; and
one or more processors configured to:
determine a quantization parameter value for the video data;

determine a quantization parameter lower bound, quantize escape values used in a palette mode for encoding the video data according to the quantization parameter lower bound if the quantization parameter value is less than the quantization parameter lower bound, wherein the escape values represent samples in a block of the video data to be encoded, determine, based on at least a component bitdepth, a maximum value for the escape values, wherein the maximum value is determined according to $(1<<(n+b))-1$, and wherein n is the component bitdepth and b is an integer, restrict one or more escape values to be no greater than the maximum value, and encode the escape values in an encoded video data bitstream.

77. The apparatus of claim 76, wherein the escape values are not associated with any entry in a palette used to represent sample values of the block of the video data.

78. The apparatus of claim 76, wherein determining the quantization parameter lower bound comprises:

choosing the quantization parameter lower bound that corresponds to a qStep value of 1.

79. The apparatus of claim 76, wherein determining the quantization parameter lower bound comprises:

determining the quantization parameter lower bound based on a component bitdepth.

80. The apparatus of claim 79, wherein determining the quantization parameter lower bound comprises:

choosing the quantization parameter lower bound equal to 4 when the component bitdepth on which the quantization parameter lower bound is based is 8.

81. An apparatus configured to decode video data, the apparatus comprising:

means for receiving a bitstream that is constrained such that escape values used in a palette mode for decoding the video data are no greater than a maximum value, wherein the maximum value is based on at least a component bitdepth, wherein the maximum value is calculated according to $(1<<(n+b))-1$, wherein n is the component bitdepth and b is an integer, and wherein the bitstream includes information for determining at least one escape value representing a sample in a block of the video data to be decoded; and means for reconstructing the sample in the block of the video data using the information for determining the at least one escape value.

82. The apparatus of claim 81, wherein the apparatus is a mobile computing device.

83. An apparatus configured to decode video data, the apparatus comprising:

means for receiving a bitstream that includes information for determining at least one escape value used in a palette mode for decoding the video data, wherein the bitstream is constrained such that it is compliant with a restriction ensuring that the at least one escape value is quantized according to a quantization parameter that is not less than a quantization parameter lower bound, and wherein the bitstream is further constrained such that escape values used in the palette mode for decoding the video data are no greater than a maximum value, wherein the maximum value is based on at least a component bitdepth, wherein the maximum value is calculated according to $(1<<(n+b))-1$, and wherein n is the component bitdepth and b is an integer;

means for determining the at least one escape value from the bitstream based on the restriction; and means for reconstructing a sample of the video data using the at least one escape value.

84. The apparatus of claim 83, wherein the apparatus is a mobile computing device.

85. A non-transitory computer-readable medium having stored thereon instructions that, when executed, cause one or more processors to:

receive a bitstream that is constrained such that escape values used in a palette mode for decoding the video data are no greater than a maximum value, wherein the maximum value is based on at least a component bitdepth, wherein the maximum value is calculated according to $(1<<(n+b))-1$, wherein n is the component bitdepth and b is an integer, and wherein the bitstream includes information for determining at least one escape value representing a sample in a block of the video data to be decoded; and reconstruct the sample in the block of the video data using the information for determining the at least one escape value.

86. A non-transitory computer-readable medium having stored thereon instructions that, when executed, cause one or more processors to:

receive a bitstream that includes information for determining at least one escape value used in a palette mode for decoding the video data, wherein the bitstream is constrained such that it is compliant with a restriction ensuring that the at least one escape value is quantized according to a quantization parameter that is not less than a quantization parameter lower bound, and wherein the bitstream is further constrained such that escape values used in the palette mode for decoding the video data are no greater than a maximum value, wherein the maximum value is based on at least a component bitdepth, wherein the maximum value is calculated according to $(1<<(n+b))-1$, and wherein n is the component bitdepth and b is an integer;

determine the at least one escape value from the bitstream based on the restriction; and reconstruct a sample of the video data using the at least one escape value.

\* \* \* \* \*